US011809289B2

(12) United States Patent
Ballard et al.

(10) Patent No.: US 11,809,289 B2
(45) Date of Patent: Nov. 7, 2023

(54) HIGH-AVAILABILITY (HA) MANAGEMENT NETWORKS FOR HIGH PERFORMANCE COMPUTING PLATFORMS

(71) Applicant: Dell Products, L.P., Round Rock, TX (US)

(72) Inventors: Lee E. Ballard, Georgetown, TX (US); Elie Antoun Jreij, Pflugerville, TX (US); Robert T. Stevens, Austin, TX (US); Bhavesh Govindbhai Patel, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/502,252

(22) Filed: Oct. 15, 2021

(65) Prior Publication Data

US 2023/0123999 A1    Apr. 20, 2023

(51) Int. Cl.
*G06F 11/20*    (2006.01)
*G06F 13/42*    (2006.01)
(Continued)

(52) U.S. Cl.
CPC ...... *G06F 11/2007* (2013.01); *G06F 13/4022* (2013.01); *G06F 13/4027* (2013.01); *G06F 13/4031* (2013.01); *G06F 13/4282* (2013.01); *G06F 15/177* (2013.01); *G06F 9/4416* (2013.01); *G06F 2213/0016* (2013.01); *G06F 2213/0042* (2013.01)

(58) Field of Classification Search
CPC ...... G06F 9/4416; G06F 11/16; G06F 11/202; G06F 11/2023; G06F 13/4004; G06F 13/4022; G06F 13/4027; G06F 13/4031; G06F 13/4282; G06F 15/177; G06F 2213/0016; G06F 2213/0042; G06F 11/2002; G06F 11/2005; G06F 11/2007
See application file for complete search history.

(56) References Cited

U.S. PATENT DOCUMENTS 6,633,585 B1 * 10/2003 Ghanwani ........... H04L 12/5601
710/60
10,754,722 B1 * 8/2020 Lin ..................... G06F 11/0709
(Continued)

OTHER PUBLICATIONS

Lee, David S., et al. "Network Topology Analysis". Sandia Report SAND2008-0069. Jan. 2008. Sandia National Laboratories. (Year: 2008).*

*Primary Examiner* — Thomas J. Cleary
(74) *Attorney, Agent, or Firm* — Fogarty LLP

(57) ABSTRACT

Embodiments of systems and methods for high-availability (HA) management networks for High Performance Computing (HPC) platforms are described. In some embodiments, an HPC platform may include a first Baseboard Management Controller (BMC) having a first network port; and a hardware accelerator comprising a second BMC having a second network port, where at least one of: (a) the first BMC is configured to share the first network port with the second BMC in response to a determination that the second network port has failed or has insufficient bandwidth, or (b) the second BMC is configured to share the second network port with the first BMC in response to a determination that the first network port has failed or has insufficient bandwidth.

20 Claims, 14 Drawing Sheets

(51) Int. Cl.
    *G06F 13/40* (2006.01)
    *G06F 15/177* (2006.01)
    *G06F 9/4401* (2018.01)

(56) References Cited

U.S. PATENT DOCUMENTS

| | | | | |
|---|---|---|---|---|
| 11,409,471 B2* | 8/2022 | Lin | G06F 3/0659 |
| 11,604,756 B1* | 3/2023 | Lambert | G06F 13/4221 |
| 11,657,013 B2* | 5/2023 | Stevens | G06F 9/4406 |
| | | | 710/313 |
| 2004/0095882 A1* | 5/2004 | Hamzah | H04L 47/263 |
| | | | 370/411 |
| 2005/0271079 A1* | 12/2005 | Teoh | H04L 41/34 |
| | | | 370/463 |
| 2007/0067528 A1* | 3/2007 | Schaffer | G06F 13/362 |
| | | | 710/116 |
| 2007/0124474 A1* | 5/2007 | Margulis | H04L 67/10 |
| | | | 709/226 |
| 2008/0104223 A1* | 5/2008 | D'Amora | H04L 67/10 |
| | | | 709/224 |
| 2010/0115167 A1* | 5/2010 | Tardieux | G06F 13/362 |
| | | | 710/240 |
| 2011/0040917 A1* | 2/2011 | Lambert | H04L 69/18 |
| | | | 710/301 |
| 2011/0138082 A1* | 6/2011 | Khatri | G06F 13/24 |
| | | | 710/52 |
| 2013/0346666 A1* | 12/2013 | Chang | G06F 13/20 |
| | | | 710/305 |
| 2014/0280837 A1* | 9/2014 | Ayanam | H04L 43/0817 |
| | | | 709/223 |
| 2014/0351654 A1* | 11/2014 | Zhang | H04L 49/552 |
| | | | 714/43 |
| 2017/0155573 A1* | 6/2017 | Khemani | H04L 41/0663 |
| 2018/0278468 A1* | 9/2018 | Rao | H04L 41/044 |
| 2019/0053290 A1* | 2/2019 | Raju | H04W 40/244 |
| 2020/0136943 A1* | 4/2020 | Banyai | H04L 43/20 |
| 2020/0285455 A1* | 9/2020 | Pan | G06F 11/1666 |
| 2021/0342075 A1* | 11/2021 | Hadav | G06F 3/0653 |
| 2021/0378148 A1* | 12/2021 | Chen | H05K 7/20272 |
| 2022/0414045 A1* | 12/2022 | Yang | G06F 13/4282 |
| 2023/0120652 A1* | 4/2023 | Stevens | G06F 13/4282 |
| | | | 710/313 |

* cited by examiner

HIGH-AVAILABILITY (HA) MANAGEMENT NETWORKS FOR HIGH PERFORMANCE COMPUTING PLATFORMS

FIELD

The present disclosure relates generally to Information Handling Systems (IHSs), and more particularly, to systems and methods for high-availability (HA) management networks for High Performance Computing (HPC) platforms.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for high-availability (HA) management networks for High Performance Computing (HPC) platforms are described. In an illustrative, non-limiting embodiment, an HPC platform may include a first Baseboard Management Controller (BMC) having a first network port; and a hardware accelerator comprising a second BMC having a second network port, where at least one of: (a) the first BMC is configured to share the first network port with the second BMC in response to a determination that the second network port has failed or has insufficient bandwidth, or (b) the second BMC is configured to share the second network port with the first BMC in response to a determination that the first network port has failed or has insufficient bandwidth.

At least one of: (a) the first BMC is configured to instantiate a first bridge coupled to a first external management connection established over the first network port, or (b) the second BMC is configured to instantiate a second bridge coupled to a second external management connection established over the second network port. The first and second bridges may be teamed.

The HPC platform may include another hardware accelerator comprising a third BMC having a third network port, where at least one of the first or second BMCs is configured to share at least one of the first or second network ports with the third BMC in response to a determination that the third network port has failed or has insufficient bandwidth, and where the third BMC is configured to share the third network port with at least one of the first or second BMCs in response to a determination that at least one of the first or second network ports has failed or has insufficient bandwidth. The first, second, and third bridges may be teamed.

The hardware accelerator comprises one or more managed subsystems coupled to the second BMC. The one or more managed subsystems may include at least one of: a Graphics Processing Unit (GPU), a Field Programmable Gate Array (FPGA), an Intelligence Processing Unit (IPU), a Data Processing Unit (DPU), a Gaussian Neural Accelerator (GNA), an Audio and Contextual Engine (ACE), or a Vision Processing Unit (VPU).

At least one of the managed subsystems may include a third BMC having a third network port. At least one of the first or second BMCs may be configured to share at least one of the first or second network ports with the third BMC in response to a determination that the third network port has failed or has insufficient bandwidth. The third BMC may be configured to share the third network port with at least one of the first or second BMCs in response to a determination that at least one of the first or second network ports has failed or has insufficient bandwidth.

The first BMC may be configured to communicate with the second BMC over a Peripheral Component Interconnect (PCIe) link using Management Component Transport Protocol (MCTP) over PCIe Vendor-Defined Messages (VDM). The second BMC may be configured to allocate a first portion of bandwidth available via the second network port to the second BMC, and a second portion of the bandwidth available via the second network port to the first BMC. The first and second portions may be selected based upon a priority of the second BMC over the first BMC. Moreover, the second BMC may be configured to instruct the first BMC to pause communications in response to a determination of insufficient bandwidth for a total network traffic of the first and second BMCs.

In another illustrative, non-limiting embodiment, a system BMC of an HPC platform may have program instructions stored thereon that, upon execution, cause the system BMC to: determine that a network port has failed or has insufficient bandwidth; and in response to the determination, communicate with a remote manager using another network port of an accelerator tray BMC.

The system BMC may be coupled to a host processor of the HPC platform, wherein the accelerator tray BMC is decoupled from the host processor, and wherein the system BMC and tray BMCs are coupled to each other via a RMII-Based Transport (RBT), I2C, or Universal Serial Bus (USB) link. The system BMC may be configured to instantiate a first bridge coupled to a first external management connection established over the network port, where the accelerator tray BMC is configured to instantiate a second bridge coupled to a second external management connection established over the other network port, and wherein the first and second bridges are teamed.

In yet another illustrative, non-limiting embodiment, a method may include instantiating, by a first BMC of an HPC platform, a first bridge coupled to a first external management connection established over a first network port; instantiating, by a second BMC of the HPC platform, a second bridge coupled to a second external management connection established over a second network port; and in response to a determination that the first network port has failed or has insufficient bandwidth, establishing the first external management connection over the second network port.

One of the first or second BMCs may be coupled to a host processor of the HPC platform, another of the first or second BMCs may be decoupled from the host processor, and the first and second BMCs are coupled to each other via a PCIe, RBT, I2C, or USB link. The method may also include apportioning a bandwidth available through the second network port to the first BMC based, at least in part, upon a priority of first external management connection over the second external management connection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
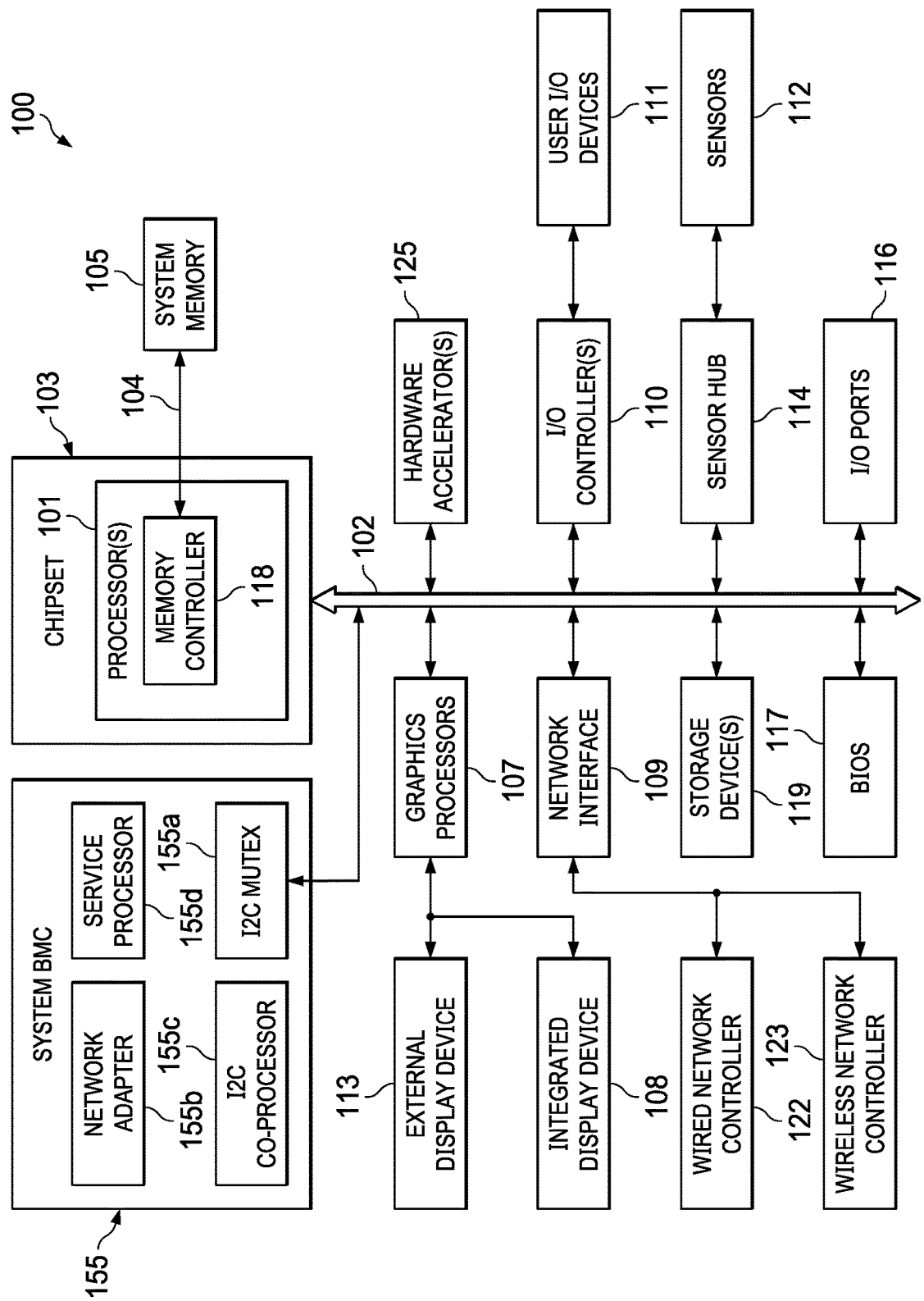
FIG. 1 is a block diagram of an example of hardware components of an Information Handling System (IHS) configured as a High-Performance Computing (HPC) platform, according to some embodiments.

As used herein, the term "High Performance Computing" or HPC generally refers to the practice of aggregating computing power in a way that delivers much higher performance than what is otherwise available in a conventional computer. Formerly the domain of specialists using proprietary supercomputers, recent advances in computing, networking, and storage technologies have made HPC systems available to a wider range of users and organizations.

To many organizations, computing workloads such as Artificial Intelligence (AI), Machine Learning (ML), data analytics, modeling, and simulation can be important sources of competitive advantage. As HPC systems become smaller, simpler, and less costly, enterprise Information Technology (IT) teams have begun adopting HPC platforms to provide the throughput and capacity needed to execute these types of workloads.

In contrast with conventional computers, an HPC platform typically includes, in addition to its main or host processor(s), multiple hardware accelerators. For example, an HPC platform may include a plurality of: Graphics Processing Units (GPUs), Field Programmable Gate Arrays (FPGAs), Intelligence Processing Units (IPUs), Data Processing Units (DPUs), Gaussian Neural Accelerators (GNAs), Audio and Contextual Engines (ACEs), Vision Processing Units (VPUs), etc. In some cases, one or more hardware accelerators may be virtualized (e.g., vGPU).

In some HPC platforms, additional GPUs may offload portions of a workload while the remainder of the workload runs on the host processor (also referred to as Central Processing Unit or "CPU"), improving overall application performance by at least an order of magnitude. In other HPC platforms, FPGAs may be used to execute certain types of algorithms up to 1,000× faster than traditional solutions with less CPU time consumed. In yet other HPC platforms, IPUs may provide massively parallel, low-precision, floating-point computing with more than 1,000 cores that communicate with each other to share the complex workloads required for machine learning.

Despite recent advances in HPC technology, the inventors hereof have recognized that the design, deployment, management, and use of HPC platforms still present unique technological challenges. For example, a hardware accelerator deployed within an HPC system may include its own Baseboard Management Controller (BMC). Yet, BMCs typically found in a conventional HPC platform are not generally made and/or intended to work together.

To address these, and other concerns, systems and methods described herein may integrate two or more BMCs, for example, to distribute the execution of management tasks among them. An Out-of-Band (OOB) management link may be provided for inter-BMC communications. In some cases, a network connection may be shared across different BMCs to create a High-Availability (HA) management network. Additionally, or alternatively, these systems and methods may provide for the intelligent management of hardware accelerator licenses, collection of telemetry data, and/or power throttling of various components of an HPC platform.

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a CPU or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured as an HPC platform according to some embodiments. As shown, IHS 100 includes one or more main or host processor(s) 101, such as a CPU, that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Certain IHS 100 embodiments may utilize sensor hub 114 (e.g., INTEL Sensor Hub or "ISH," etc.) capable of sampling and/or collecting data from a variety of hardware sensors 112. In certain embodiments, sensor hub 114 may be an independent microcontroller or other logic unit that is coupled to the motherboard of IHS 100. Sensor hub 114 may be a component of an integrated SoC incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

Sensors 112 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

As illustrated, IHS 100 includes BMC 155 to provide capabilities for remote monitoring and management of various aspects of IHS 100. In support of these operations, BMC 155 may utilize both in-band and sideband/OOB communications with certain managed components of IHS 100, such as, for example, processor(s) 101, system memory 105, network controller 109, storage device(s) 119, BIOS 117, and/or sensors 112.

BMC 155 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell Power-Edge™ servers and provides functionality that helps information technology (IT) administrators deploy, update, monitor, and maintain servers remotely.

BMC 155 may operate from a different power plane from processor(s) 101, storage devices 119, network controller 109 and various other components of IHS 100, thus allowing the BMC 155 to operate, and management tasks to proceed, while the processing cores of processor(s) 101 are powered off In some embodiments, BMC 155 may control what OS BIOS 117 launches, by setting BIOS boot options that tell BIOS 117 where to load and launch the OS from. In some embodiments, BMC 155 may also perform various operations to verify the integrity of IHS 100 and its hardware components prior to initialization of IHS 100 (i.e., in a bare-metal state).

BMC 155 may support monitoring and administration of managed components via a sideband bus interface. For instance, messages utilized in device management may be transmitted using $I^2C$ sideband bus connections that may be individually established with each of managed component through the operation of $I^2C$ multiplexer 155a. Managed components may communicate with the OS of IHS 100 via in-band buses supported by chipset 103, while the sideband buses are used exclusively for communications with BMC 155.

In certain embodiments, service processor 155d of BMC 155 may rely on $I^2C$ co-processor 155c to implement sideband communications between the BMC 155 and the managed components of the IHS 100. $I^2C$ co-processor 155c may be a specialized co-processor or microcontroller that is configured to interface via a $I^2C$ bus interface with the managed components. In some cases, $I^2C$ co-processor 155c may be an integrated component of service processor 155d, such as a peripheral SoC feature that may be provided by service processor 155d. However, each $I^2C$ bus may be comprised of a clock line and data line that couple BMC 155 an $I^2C$ Endpoint on each of the managed components.

As illustrated, $I^2C$ co-processor 155c may interface with the individual managed components via individual sideband $I^2C$ buses selected through the operation of $I^2C$ multiplexer 155a. Switching operations by $I^2C$ multiplexer 155a may establish a sideband bus connection through a direct coupling between $I^2C$ co-processor 155c and each individual managed component of IHS 100. In providing sideband management capabilities, $I^2C$ co-processor 155c may interoperate with corresponding Endpoint $I^2C$ controllers that implement the $I^2C$ communications of the respective IHS components. Endpoint $I^2C$ controllers may be implemented as dedicated microcontrollers for communicating sideband I²C messages with BMC 155 or may be integrated into a processor in its respective endpoints.

In various embodiments, chipset 103 may provide processor 101 with access to hardware accelerator(s) 125. Instances of accelerator(s) 125 include, but are not limited to, GPUs, FPGAs, IPUs, GNAs, ACEs, VPUs, etc. For example, hardware accelerator(s) 125 may be configured to execute HPC and/or AI/ML workloads offloaded by processor 101 and may be disposed on an accelerator tray deployed within the chassis of IHS 100. In cases where one or more hardware accelerator(s) 125 have their own BMC(s), BMC 155 may be referred to as "system BMC 155."

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

BMC Integration

In modern IHS architectures, system BMC 155 is the focal point of systems management activities. When one or more hardware accelerator(s) 125 (e.g., a complex adapter card, a multi-processor tray, etc.) are deployed in an HPC platform, however, each hardware accelerator may have its own, independent BMC. Typically, these independent BMCs are not accessible to processor(s) 101 and there is no integration with system BMC 155.

To address these shortcomings, embodiments described herein provide systems and methods for integrating a second BMC (or any additional number of BMCs) with system BMC 155, such that the second BMC(s) may be configured to act as an extension of system BMC 155 and/or to offload management tasks (e.g., firmware updates, real-time monitoring, telemetry, etc.) while maintaining a single point of control.

For example, in a particular HPC implementation where an accelerator tray having a plurality of hardware accelerator devices or components (e.g., GPUs, FPGAs, IPUs, GNAs, ACEs, VPUs, etc.) and a tray BMC is deployed along with a high-speed management link between system BMC 155 and the tray BMC, system BMC 155 may communicate with tray BMC rather than having to access each accelerator device individually. Additionally, or alternatively, the tray BMC may be assigned, by system BMC 155, local control, monitoring, and/or pre-processing of selected types of data (e.g., telemetry data).

Figure 2:
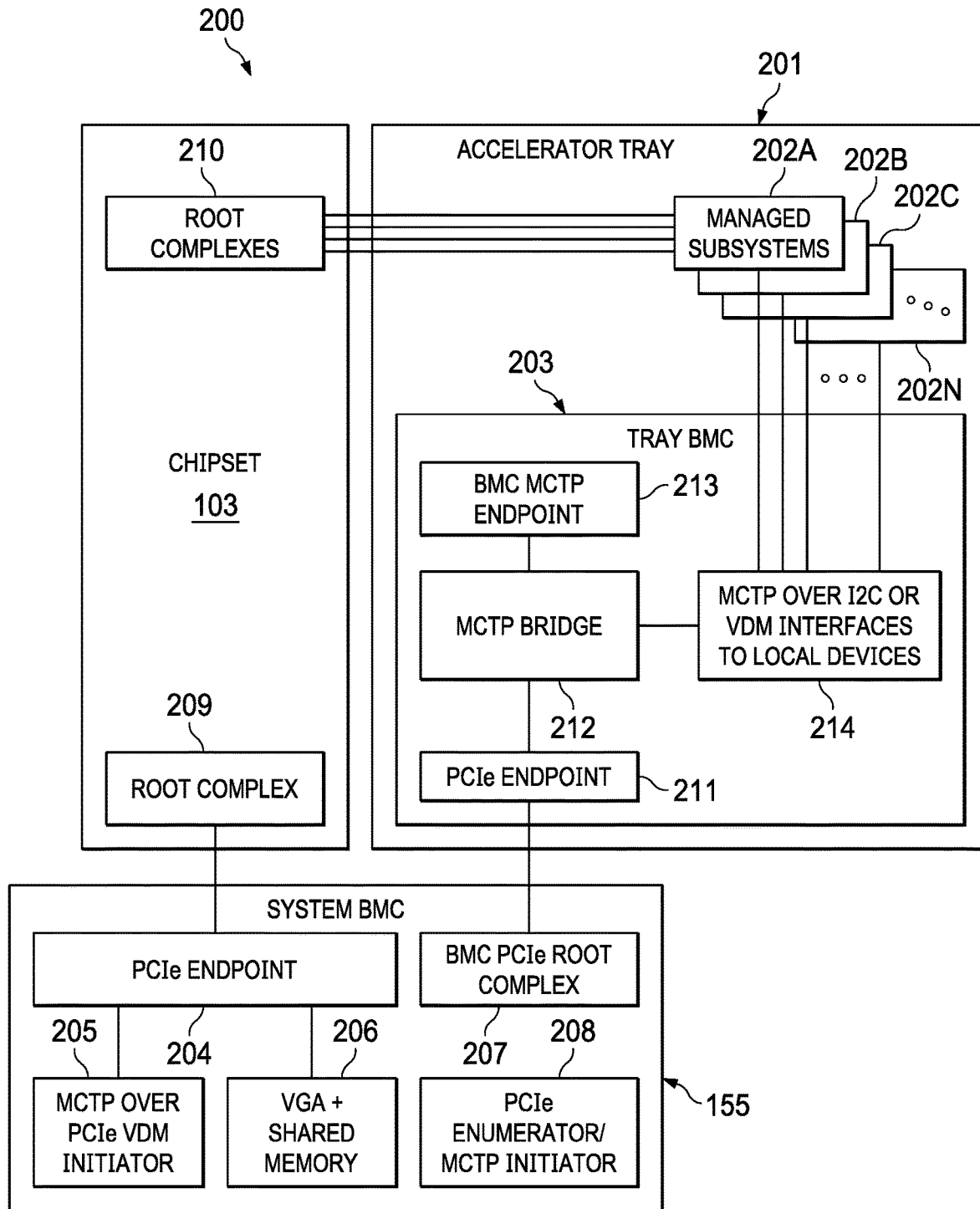
FIG. 2 is a block diagram illustrating an example of a Baseboard Management Controller (BMC) integration system in an HPC platform, according to some embodiments.

FIG. 2 is a block diagram illustrating an example of a BMC integration system in HPC platform 200. In this non-limiting embodiment, system BMC 155 may own the device management of HPC platform 200 while tray BMC 203 may act as a bridge.

As shown, service processor 155*d* of system BMC 155 includes Peripheral Component Interconnect Express (PCIe) Endpoint 204, Management Component Transport Protocol (MCTP) over PCIe Vendor-Defined Messages (VDM) initiator engine 205, Video Graphics Array (VGA) and shared memory 206, BMC PCIe Root Complex 207, and PCIe enumerator/MCTP initiator 208, each of which may be implemented, for example, as an IP core within an SoC. PCIe Endpoint 204 is coupled to Root Complex 209 of chipset 103 for communication with processor(s) 101 for in-band communications.

Accelerator tray 201 is an example of hardware accelerator(s) 125 in the context of HPC platform 100. Particularly, accelerator tray 201 may include a plurality of managed subsystems 202A-N (e.g., GPUs, VPUs, GNAs, FPGAs, IPUs, etc.) and a single, independent tray BMC 203. Each of managed subsystems 202A-N may include its own in-band PCIe connection to chipset 103 via Root Complexes 210.

In contrast with managed subsystems 202A-N, tray BMC 203 lacks access to Root Complexes 210 within chipset 103 and therefore sits outside of the host's PCIe hierarchy. Tray BMC 203 may include PCIe Endpoint 211, MCTP bridge 213, BMC MCTP Endpoint 213, and MCTP over I2C or VDM interfaces 214 to managed subsystems 202A-N.

MCTP bridge 213 may enable system BMC 155 to communicate directly with managed subsystems 202A-N on accelerator tray 201. Particularly, PCIe VDM messages include routing information, and bridge knows the address of tray BMC MCTP Endpoint 213, as well as the addresses of managed subsystems 202A-N and/or interfaces 214. Accordingly, MCTP bridge 213 may operate as a transparent bridge to allow MCTP messages to be properly routed between system BMC 155 and managed subsystems 202A-N.

System BMC 155 may target BMC MCTP Endpoint 213 to communicate with tray BMC 203 over MCTP bridge 213. In response, tray BMC 203 may expose its directly managed devices, such as fan(s), memor(ies), etc., to system BMC 155, as well as managed subsystems 202A-N, so that system BMC 155 may control one or more such devices. System BMC 155 is coupled to tray BMC 203 via a high-speed, OOB management link, as BMC PCIe Root Complex 207 is coupled to PCIe Endpoint 211 via a PCIe connection.

Figure 3:
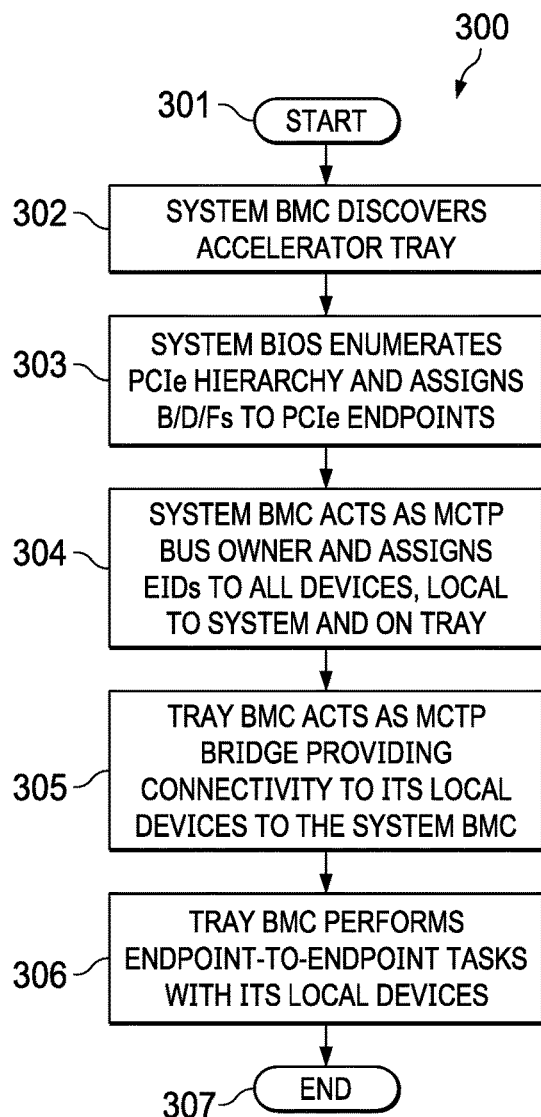
FIG. 3 is a flowchart illustrating an example of a method of BMC integration, according to some embodiments.

FIG. 3 is a flowchart illustrating an example of method of BMC integration 300. In some embodiments, method 300 may be performed, at least in part, by HPC platform 200. Particularly, method 300 starts at 301. At 302, system BMC 155 discovers accelerator tray 201, for example, while in the S5 Advanced Configuration and Power Interface (ACPI) power state. At 303, system BIOS 117 enumerates the PCIe hierarchy and assigns Bus, Device, Function numbers (e.g., each a 16-bit number) to all PCIe Endpoints.

At 304, system BMC 155 acts as MCTP Bus Owner and assigns Endpoint IDs (EIDs) to devices local to platform 200 and on acceleratory tray 201. At 305, tray BMC 203 acts as MCTP bridge providing, to system BMC 155, connectivity to managed subsystems 202A-N. Then, at 306, tray BMC 203 may perform endpoint-to-endpoint tasks with managed subsystems 202A-N for telemetry and/or other purposes. Method 300 ends at 307.

Figure 4:
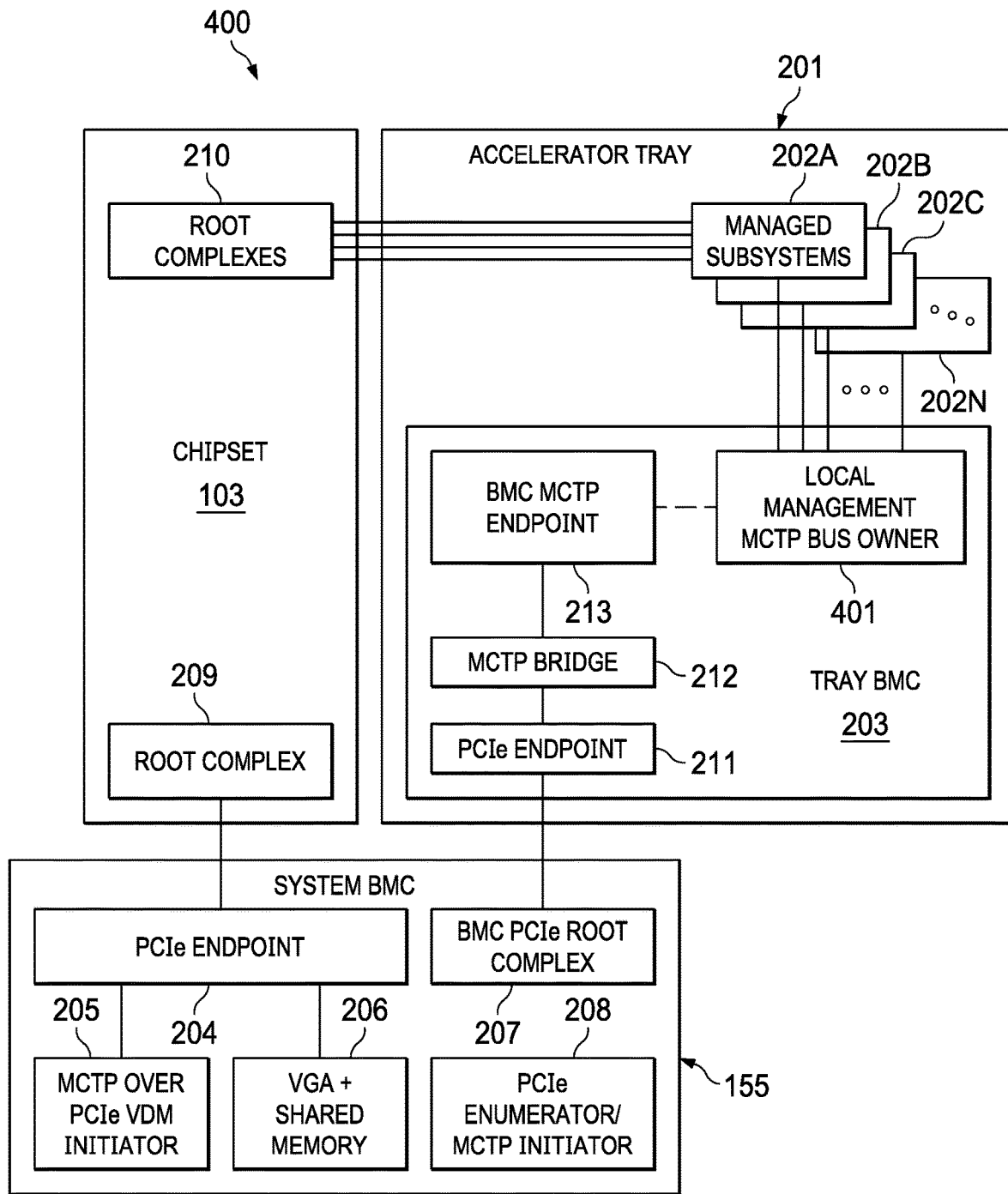
FIG. 4 is a block diagram illustrating an example of another BMC integration system in an HPC platform, according to some embodiments.

FIG. 4 is a block diagram illustrating an example of another BMC integration system in HPC platform 400. In this non-limiting embodiment, system BMC 155 may own a portion of the device management of platform 400 while tray BMC 203 owns another portion, thus acting as peer (or near-peer) BMCs. In contrast with platform 200 of FIG. 2, here tray BMC 203 includes Local Management MCTP Bus Owner 401 coupled to BMC MCTP Endpoint 213.

In some embodiments, selected aspects of HPC platforms 300 and 400 may be combined in a single implementation. For example, Local Management MCTP Bus Owner 401 may be coupled to a first subset of managed subsystems 202A-N, and MCTP bridge 212 may be coupled to a second subset of managed subsystems 202A-N via MCTP over I²C or VDM interfaces 214.

This may be useful, for example, when the first subset of managed subsystems 202A-N is intended to be kept private or not directly accessible to system BMC 155, and the second subset of managed subsystems 202A-N is intended to be kept public, or otherwise directly accessible to system BMC 155. Additionally, or alternatively, this may be useful in situations where the availability of unique PCIe addresses is restricted, such that more of (or all) managed subsystems 202A-N are made accessible by system BMC 155 only through tray BMC 203. In some cases, the type of connection between PCIe Endpoint 211 and managed subsystems 202A-N within tray BMC 203 may be configurable and/or user selectable.

Figure 5:
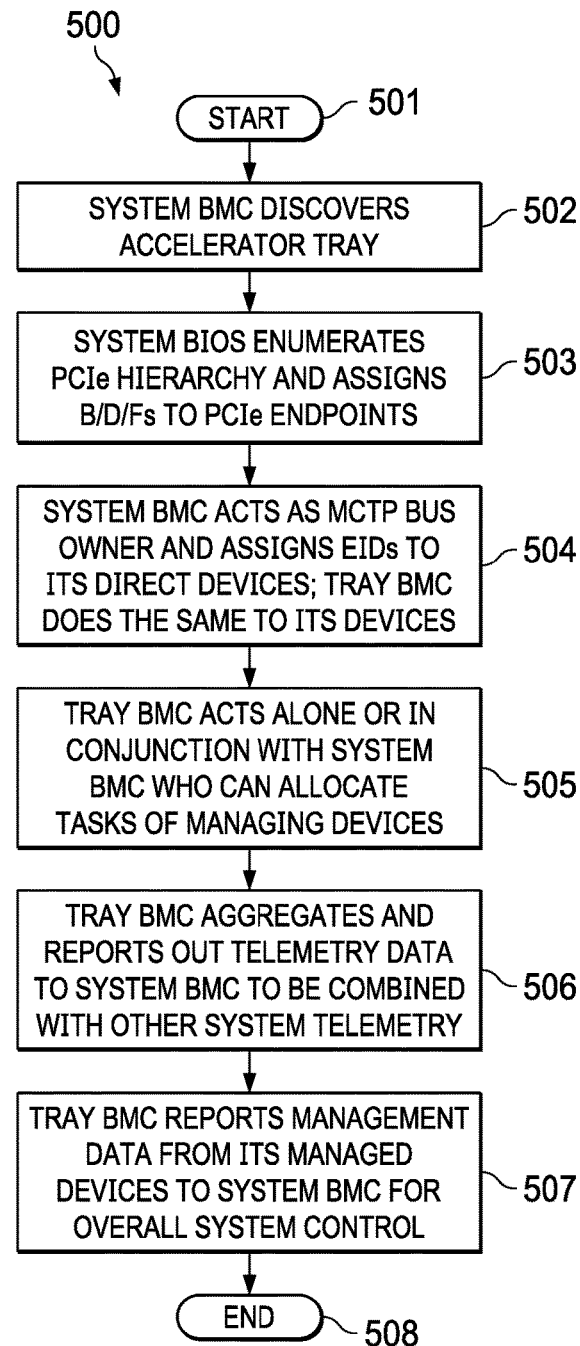
FIG. 5 is a flowchart illustrating an example of another method of BMC integration, according to some embodiments.

FIG. 5 is a flowchart illustrating an example of another method of BMC integration 500. In some embodiments, method 500 may be performed, at least in part, by HPC platform 400. Specifically, method 500 starts at 501. At 502, system BMC 155 discovers accelerator tray 201. At 503, system BIOS 117 enumerates the PCIe hierarchy and assigns Bus, Device, Function numbers (e.g., 16-bit) to PCIe Endpoints.

At 504, system BMC 155 acts as MCTP Bus Owner and assigns Endpoint IDs (EIDs) to its directly managed devices. Tray BMC 203 does the same with respect to its managed subsystems 202A-N. At 505, tray BMC 203 performs one or more management tasks standalone or in conjunction with system BMC 155, leaving system BMC 155 in charge of allocating and/or scheduling tasks between them, for example, based on context (e.g., more or fewer delegated tasks depending upon the type of workload being executed by managed subsystems 202A-N, resources being consumed by managed subsystems 202A-N, amount of data being collected from managed subsystems 202A-N, etc.). For example, system BMC 155 may assign tray BMC 203 the task of compressing telemetry data collected from managed subsystems 202A-N, deploying firmware updates to managed subsystems 202A-N, etc.

At 506, tray BMC 203 may aggregate and report out telemetry data to system BMC 155, for example, to be combined with other platform telemetry. At 507, tray BMC 503 may report selected management data from its managed devices to system BMC 155 for overall HPC platform 400 control. Method 500 ends at 508.

Figure 6:
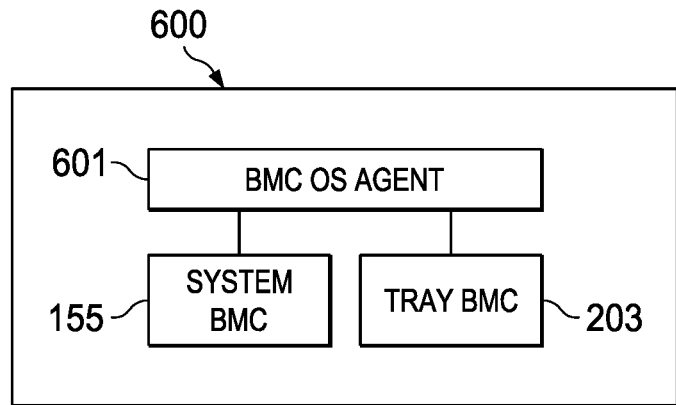
FIG. 6 is a block diagram illustrating an example of a BMC OS agent deployed as a management link between BMCs in a single HPC platform, according to some embodiments.

FIG. 6 is a block diagram illustrating an example of BMC OS agent 601 deployed as a management link between system BMC 155 and tray BMC 203 in single HPC platform 600. In some embodiments, when a high-speed, OOB link between BMC PCIe Root Complex 207 and PCIe Endpoint 211 (as previously discussed in FIGS. 2 and/or 4) is not working properly, BMC OS agent 601 may provide a fail-over, in-band communication link between system BMC 155 and tray BMC 203 to relay management data.

Particularly, BMC OS agent 601 may serve as a pass-through connection by reading MCTP packets (or other suitable protocol) from one BMC and sending it to the other BMC. In some cases, an Intelligent Platform Management Interface (IPMI) or Redfish Application Programming Interface (API) command may be defined to encapsulate and transport messages and responses between the two BMCs.

Figure 7:
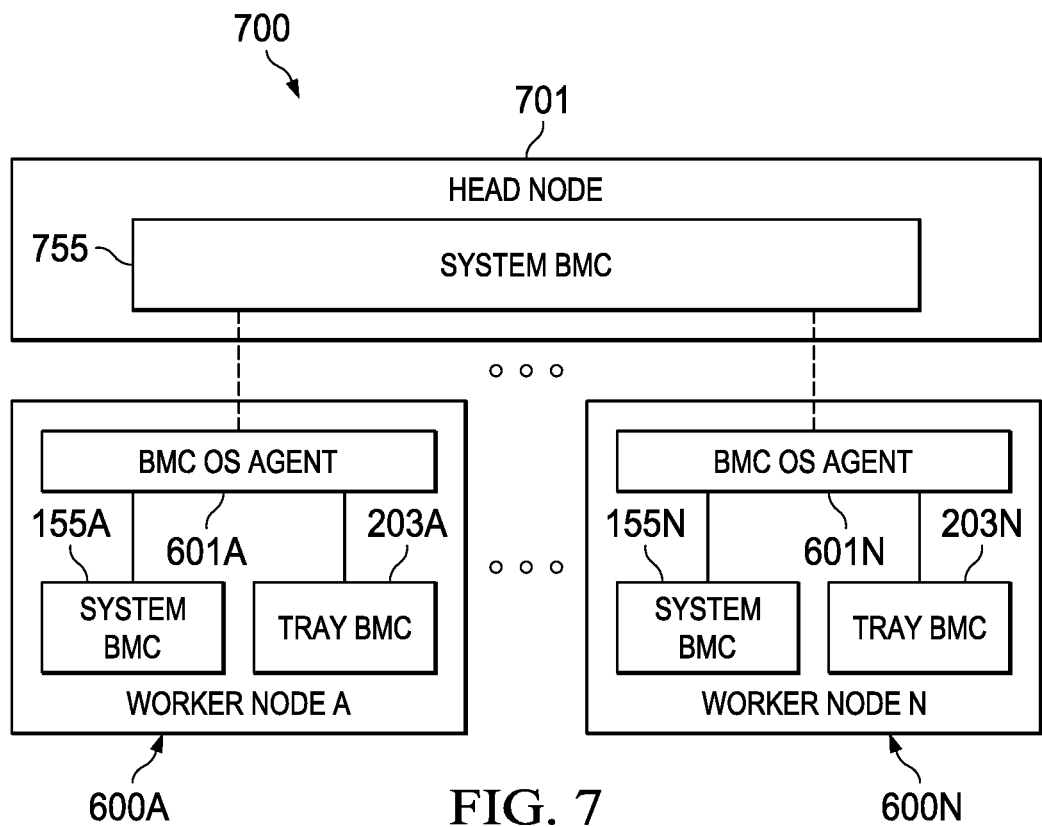
FIG. 7 is a block diagram illustrating an example of BMC OS agents deployed as management links between system BMCs and tray BMCs across a plurality of HPC platforms, according to some embodiments.

FIG. 7 is a block diagram illustrating an example of BMC OS agents 601A-N deployed as management links between system BMCs 155A-N and tray BMCs 203A-N across a plurality of HPC platforms 600A-N. In some embodiments, system BMC 755 of head node 701 (e.g., in a server rack) may enable communications between BMC OS agents 601A-N to relay management data across different HPC platforms 600A-N.

As such, systems and methods described herein may employ MCTP over PCIe VDM (or other high bandwidth interface) for inter-BMC communications. Additionally, or alternatively, these systems and methods may use an adapter or tray BMC PCIe as a management terminus and/or an MCTP bridge for directly managed subsystems on an accelerator adapter, card, or tray. Additionally, or alternatively, these systems and methods may use an accelerator adapter, card, or tray BMC as an aggregator to pre-process and/or compress large amounts of telemetry data generated locally.

Additionally, or alternatively, these systems and methods may use an accelerator adapter, card, or tray BMC as an MCTP bridge to translate the high-speed PCI VDM interface to another, potentially slower management interfaces of its managed subsystems. Additionally, or alternatively, these systems and methods may use an accelerator adapter, card, or tray BMC to offload sideband firmware updates from the system BMC/update agent for managed subsystems.

Additionally, or alternatively, these systems and methods may use an accelerator adapter, card, or tray BMC in peer-to-peer mode with the system BMC in a shared management architecture. Additionally, or alternatively, these systems and methods may use an OS agent for inter-BMC communications, for example, as a fallback when the direct link between two or more BMCs is not available or operational.

High-Speed, OOB Management Links for Inter-BMC Communications

In an HPC platform, consider that the telemetry of as few as eight GPUs 202A-N may require more bandwidth than the total bandwidth available via conventional $I^2C$ or $I^3C$ links. In many implementations (e.g., HPC platforms 200 and 400), however, tray BMC 203 is outside chipset 103's PCIe hierarchy and therefore it does not have access to PCIe resources otherwise available to system BMC 155. Accordingly, under a new paradigm where system BMC 155 and tray BMC 203 are integrated and configured to communicate data (e.g., telemetry data) directly to each other, a high-speed inter-BMC connection is needed.

To address these, and other issues, systems and methods described herein may provide a high-speed, OOB management link between system BMC 155 and tray BMC 203. The high-speed, OOB management link may be used, for example, as a sideband interface to managed subsystems 202A-N, for localized Root-of-Trust (RoT) domain attestation, distributed operation of tray sensors, etc.

Figure 8:
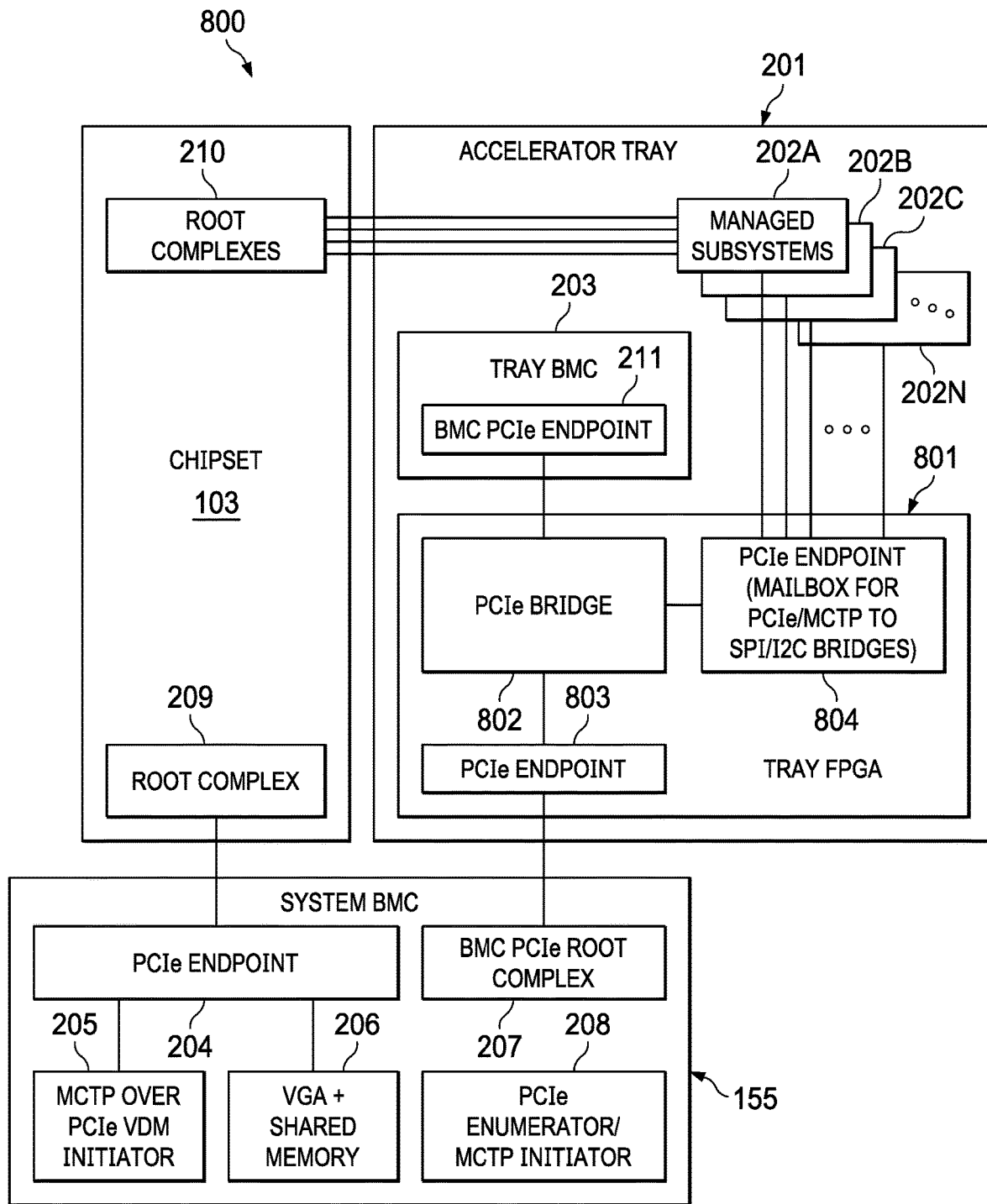
FIG. 8 is a block diagram illustrating an example of a high-speed, Out-Of-Band (OOB) management link between BMCs, according to some embodiments.

FIG. 8 is a block diagram illustrating an example of a high-speed, OOB management link between BMCs 155 and 203 in HPC platform 800. In some embodiments, system BMC 155 of HPC platform 800 may own the OOB hierarchy, including direct bridges.

As shown in HPC platform 800, tray 201 includes BMC 203 with BMC PCIe Endpoint 211. Tray FPGA 801 includes PCIe bridge 802 coupled to BMC PCIe Endpoint 211, and PCIe Endpoint 803 coupled to BMC PCIe Root Complex 207. PCIe Endpoint (mailbox for PCIe/MCTP to SPI/I2C bridges) 804 couples PCIe bridge 802 to managed subsystems 202A-N, and it includes logic configured to convert MCTP messages into low level SPI/I2C messages, and vice versa. In other implementations, however, because BMC PCIe Root Complex 207 of system BMC 155 is coupled directly to PCIe Endpoint 807 in tray 201, the use of MCTP is not required.

Figure 9:
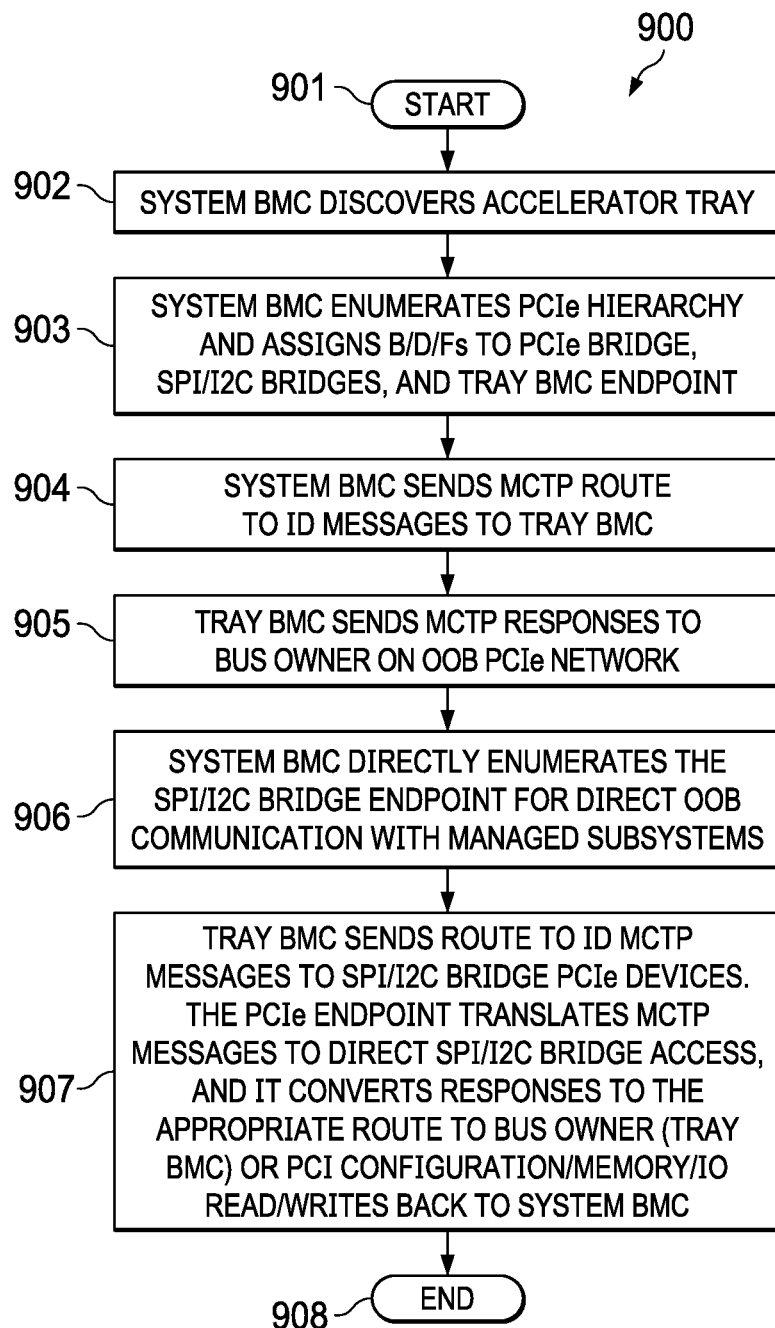
FIG. 9 is a flowchart illustrating an example of a method for establishing and maintaining a high-speed, OOB management link between BMCs, according to some embodiments.

FIG. 9 is a flowchart illustrating an example of method 900 for establishing and maintaining a high-speed, OOB management link between BMCs. In some embodiments, method 900 may be performed, at least in part, by HPC platform 800. Specifically, method 900 starts at 901. At 902, system BMC 155 discovers accelerator tray 201. At 903, system BIOS 117 enumerates the PCIe hierarchy and assigns Bus, Device, Function numbers to PCIe bridge 802, SPI/$I^2C$ bridges 804, and BMC PCIe Endpoint 211.

At 904, in this implementation, system BMC 155 sends MCTP Route to ID messages to tray BMC 203. At 905, tray BMC 203 sends MCTP responses to the Bus Owner on OOB the PCIe network. At 906, system BMC 155 directly enumerates SPI/I²C bridge Endpoint 804 for direct OOB communications with managed subsystems 202A-N.

At 907, tray BMC 203 sends Route to ID MCTP messages to SPI/I²C bridge 802. PCIe Endpoint 804 translates MCTP messages to direct SPI/I²C bridge accesses to managed subsystems 202A-N and converts responses from managed subsystems 202A-N to the appropriate Route to Bus Owner (tray BMC 203) or PCI configuration/memory/IO reads/writes back to system BMC 155. Method 900 ends at 908.

Figure 10:
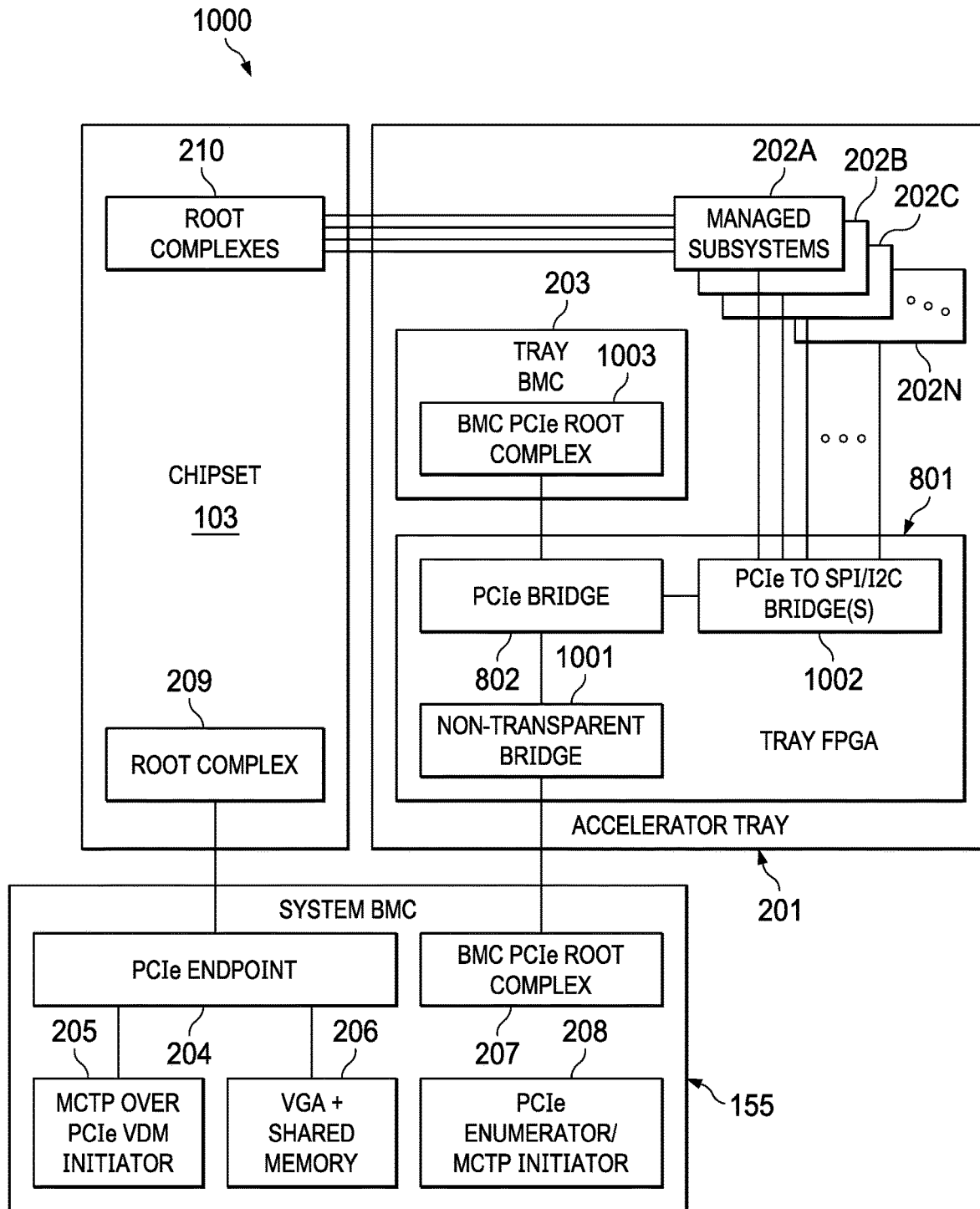
FIG. 10 is a block diagram illustrating another example of a high-speed, OOB management link between BMCs, according to some embodiments.

FIG. 10 is a block diagram illustrating another example of a high-speed, OOB management link between BMCs 155 and 203 in HPC platform 1000. In some embodiments, BMC integration in HPC platform 1000 may include dual OOB Root Complex messaging via non-transparent bridging and BMC proxy.

As shown, tray BMC 203 includes BMC Root Complex 1003. Tray FPGA 801 includes PCIe bridge 802 coupled to BMC Root Complex 1003 and to non-transparent bridge (NTB) 1001. NTB 1001 is coupled to BMC PCIe Root Complex 207. In operation, NTB 1001 enables different PCIe Root Complexes 207 and 1003 to communicate across domains.

PCIe to SPI/I2C bridges 1002 couple PCIe bridge 802 to managed subsystems 202A-N. To access or communicate with managed subsystems 202A-N, system BMC 155 may send MCTP messages to tray BMC 203, which may then act as a proxy with respect to managed subsystems 202A-N and forwards those messages (and responses) to SPI/I²C devices 1002.

Figure 11:
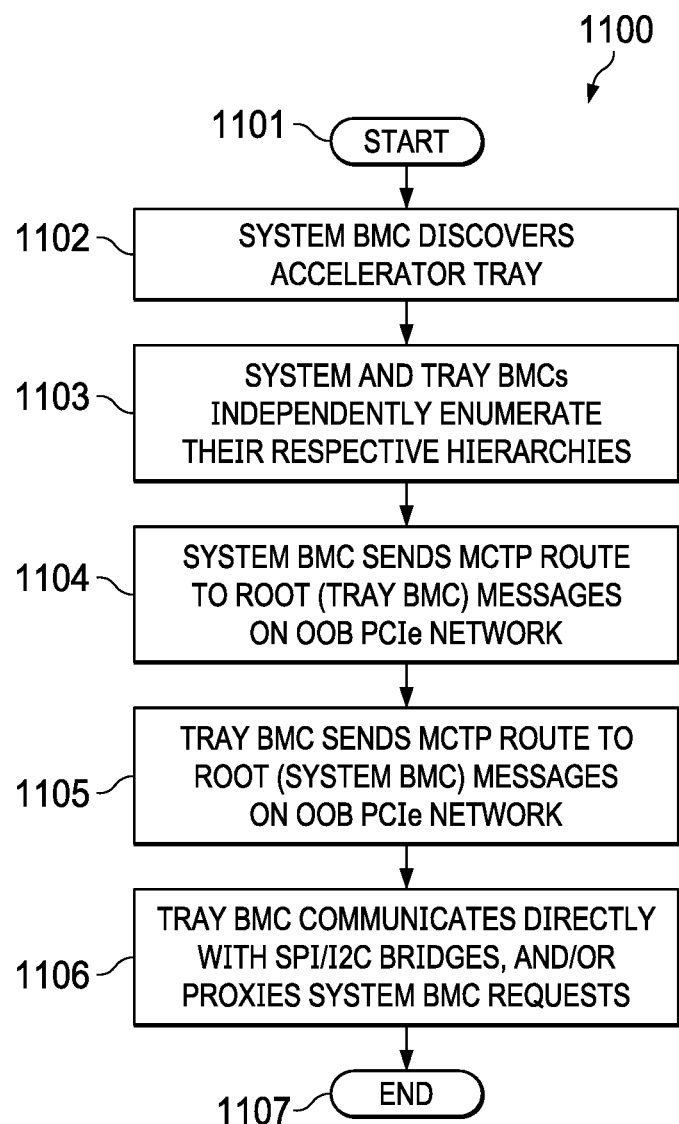
FIG. 11 is a flowchart illustrating an example of another method for establishing and maintaining a high-speed, OOB management link between BMCs, according to some embodiments.

FIG. 11 is a flowchart illustrating an example of method 1100 for establishing and maintaining a high-speed, OOB management link between BMCs. In some embodiments, method 1100 may be performed, at least in part, by HPC platform 1000. Specifically, method 1100 starts at 1101. At 1102, system BMC 155 discovers accelerator tray 201.

At 1103, system and tray BMCs 155 and 203 independently enumerate their respective hierarchies. At 1104, system BMC 155 sends MCTP Route to Root (tray BMC 203) messages on the OOB PCIe network. At 1105, tray BMC 203 sends MCTP Route to Root (system BMC 155) messages on the OOB PCIe network. Then, at 1106, tray BMC 203 may communicate directly with SPI/I²C bridges 1002. Method 1100 ends at 1007.

As such, systems and methods described herein may use a BMC Root Complex as a virtual MCTP Bus Owner. Additionally, or alternatively, these systems and methods may use an add-in subsystem BMC's PCIe Root Complex and an MCTP target via non-transparent bridging and cross-route-to-root message routing. Additionally, or alternatively, these systems and methods may use tray BMC 203 for local peripheral communication via MCTP, along with a PCIe Endpoint that translates MCTP messages to local peripheral status/controls, and to round peripheral responses appropriate to either MCTOP via Route to Bus Owner or to the true root (system BMC 155) via PCI transactions (e.g., config/mem/IO R/W, etc.).

Additionally, or alternatively, these systems and methods may enable selectively making devices (e.g., managed subsystems 202A-N) behind each BMC private or public (e.g., based on context, type of container executing an application, type of application, type of workload requested by an application, etc.), such that private devices are not discoverable by other BMCs while public devices may be. For example, tray BMC 203 may execute filtering or access control algorithms that determine which of managed subsystems 202A-N can be managed or accessed by system BMC 155 based on a policy (e.g., current context, workloads being executed, etc.).

High-Availability Management Network

Each BMC has a single, discrete/dedicated physical network port for management connections (e.g., via an Ethernet connector). If the management connection fails because of a malfunction of the BMC's network interface controller or switch port, for example, the BMC cannot be remotely managed. This concern applies equally to system BMC 155, tray BMC 203, or any other peripheral device BMC in an HPC platform.

In many cases, however, internal connections may exist between discrete BMCs. These connections may include, for example, I²C, PCIe VDM, USB, RMII-Based Transport (RBT), etc. As noted above, two BMCs can use these interconnects as well as one or more high-speed OOB management links to communicate status information and other management operations between system BMC 155 and tray BMC 203 (or other peripheral BMCs).

Accordingly, in various embodiments, systems and methods described herein may enable a first BMC in an HPC platform to use a second BMC's management connection for external communications with a remote manager, for example, when the first BMC's management connection fails or has insufficient bandwidth. To achieve high availability, BMCs in an HPC platform may be configured to bridge their external management connections to a channel/tunnel on internal interconnects, and then team/bond this bridge with channels/tunnels that are bridged by other BMCs to their own external management connections.

When a BMC's network fails and it starts using another BMC's network, there may not be sufficient bandwidth to handle traffic between the two BMCs. In some cases, a traffic priority mechanism may be implemented such that a first BMC can instruct a second BMC to pause sending packets out using the first BMC's network while the first BMC is handling high-priority traffic. In those cases, telemetry and other streamed data from the second BMC may be paused until the first BMC gives the second BMC permission to transmit using the first BMC's network.

Alternatively, if the pause frame method is not implemented or not honored, the BMC sharing the uplink can shape the traffic using traffic control, and it may drop packets from the other BMC when they exceed an allowed rate (leaky bucket). For Transmission Control Protocol (TCP) communications, the BMC may automatically slow down its transmission.

In some implementations, priority of access to a given management network may be configurable. For example, priority may be given to the BMC that has not lost its network. Alternatively, a greater amount of bandwidth may be allocated to whichever BMC and/or external management connection is considered higher priority, regardless of whether its network connection has failed or not, for example, based upon context (e.g., an ongoing telemetry operation by either BMC, an ongoing live-monitoring operation by either BMC, an ongoing firmware update operation by either BMC, etc.).

Figure 12:
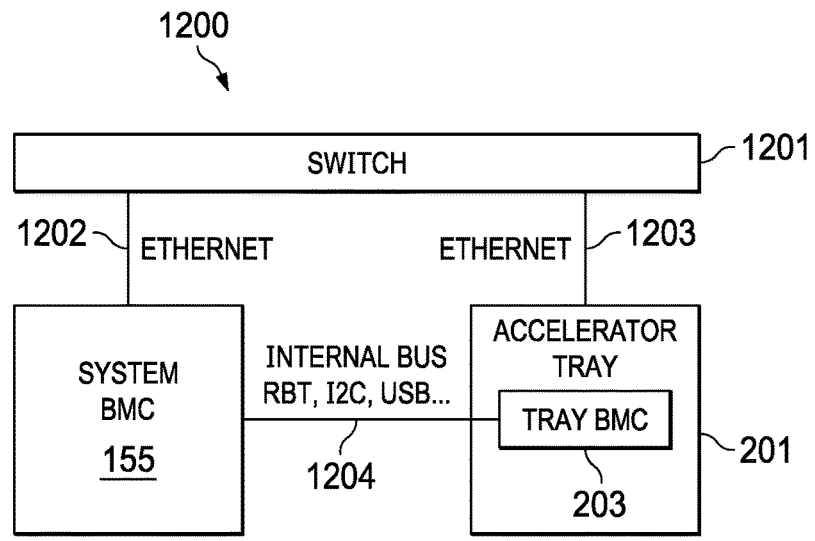
FIG. 12 is a block diagram illustrating examples of internal and external connections of a pair of BMCs, according to some embodiments.

FIG. 12 is a block diagram illustrating examples of internal and external connections of a pair of BMCs 155 and 203 in HPC platform 1200. As shown, system BMC 155 is coupled to network switch 1201 via external management network port 1202 (e.g., Ethernet). Meanwhile, tray BMC 203 of accelerator tray 201 is coupled to network switch

1201 via its own external management network port 1203. System BMC 155 and tray BMC 203 are directly coupled to each other via internal bus 1204 (e.g., RBT, I²C, USB, etc.).

In normal operation, system BMC 155 and tray BMC 103 have independent network connectivity and internal bus 1204 is used for inter-BMC communications only. In response to network port 1202 not working, however, system BMC 155 may use tray BMC 103's network port 1203 for external communications and vice-versa. This may be achieved, for instance, by bridging and teaming if bus 1204 between system BMC 155 and tray BMC 103 is Ethernet-capable. Otherwise, system BMC 155 may encapsulate its network traffic into MCTP packets to tray BMC 203, and tray BMC 203 may send those packets out over network port 1203 and vice-versa.

Figure 13:
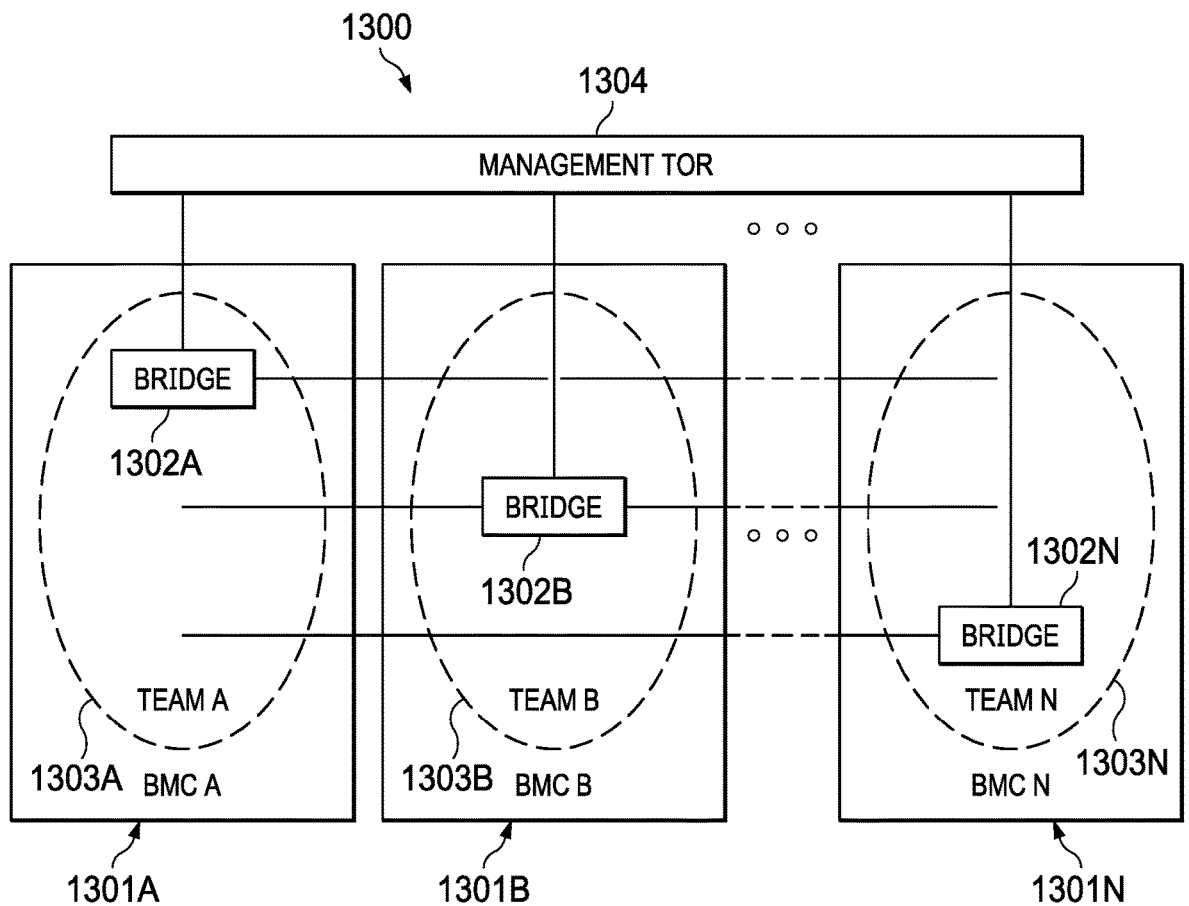
FIG. 13 is a flowchart illustrating an example of a management network topology for establishing and maintaining a High-Availability (HA) network among BMCs, according to some embodiments.

FIG. 13 is a flowchart illustrating an example of management network topology 1300 for establishing and maintaining a HA network among BMCs 1301A-N. In some embodiments, BMC 1301A may be implemented as system BMC 155, BMC 1301B may be implemented as tray BMC 203, and BMC 1301N may be implemented as another BMC (e.g., another tray BMC, a BMC coupled to one of GPUs 202A-N, etc.). Each of BMCs 1301A-N is coupled to management TOR (The Onion Router).

Each of BMCs 1301A-N may share its uplink with other BMCs using bridges 1302A-N, respectively. Moreover, BMCs 1301A-N may be integrated and/or in communication with each other via a high-speed, OOB management link using techniques described above, and the bridging may take place over that link. In the previous example, when network port 1202 not working system BMC 155 may send a notification to switch 1201, via BMC 2, to update a forwarding table or database (e.g., of IP and/or MAC addresses, etc.) to start redirecting, to tray BMC 203, packets intended to system BMC 155.

In some implementations, internal connections from each BMC may be a separate Ethernet interface, or VLAN (or other network overlay) with isolated broadcast domains. For HA and loop prevention, each of BMCs 1301A-N may create a respective active/standby bond-team 1303A-N for its respective uplink bridge 1302A-N and internal connections with uplink as preferred. Moreover, in some cases, L2 pause frames and/or traffic control mechanisms may be employed to prioritize and shape traffic, for example, to maintain a Quality-of-Service (QoS) metric, to allocate a portion of the bandwidth (e.g., 20%) to the BMC that owns the external connection, to throttle another BMC's external communications based on priority, etc.

As such, systems and methods described herein may provide redundancy to a BMC network without adding a second dedicated network port to any given BMC. Additionally, or alternatively, these systems and methods may provide a priority mechanism for sharing a BMC network port when another BMC's network port has failed. Additionally, or alternatively, these systems and methods may enable a BMC to use another one or more BMC network port(s), in the absence of failure, for example, for additional communication bandwidth. Additionally, or alternatively, these systems and methods may prevent loops while all operational links are used because they are primary in an associated BMC NIC teaming. Additionally, or alternatively, these systems and methods may use Address Resolution Protocol (ARP) polling to send traffic over internal tunnels if an associated external link is operational.

Accelerator License Management

Software tools and intellectual property (IP) cores often require a license to operate. A license entitlement may be set up, for example, after a customer's order has been processed, and it may be managed by a license manager configured to generate a license.dat file. This file enables a customer to use the software or product licensed under the terms of the purchase. In some cases, a license maybe certificate-based for security purposes.

As hardware accelerators expand the types of applications they support, it becomes important for each device to adjust and tune their capabilities depending upon the type of workload(s) they are executing. Some workloads may require advanced features and others may require basic features. Prior to executing a workload, a hardware accelerator may perform a license verification operation whereby it may determine, from a larger set of potentially available features, which subset of features it has been allowed to use during execution of the workload (e.g., number of cores that can be active, available software capabilities, etc.).

In an HPC platform, the large number of individual accelerators and accelerator cores can make the license management process difficult. For example, although application and/or workload requirements may change dynamically, at least insofar as different applications can be executed by the same HPC platform, there is presently no mechanism capable of matching workload requirements to licenses in real time. These shortcomings become even more apparent when an HPC platform is made available "as-a-service," such that users/customers may lease the HPC platform from a service provider who remains in control of the usage and monetization of the HPC platform's accelerators with a chosen level of granularity.

To address these, and other concerns, systems and methods described herein may create a flexible licensing model that supports dynamic changes to licenses based upon workload requirements. In such a model, hardware accelerator licenses may be dynamic selected based upon the workload, type of workload, and/or workload requirements (e.g., as identified by the application requesting execution of the workload). For example, system BMC 155, tray BMC 203, and/or license manager 1405 may generate a list or queue of workloads, or types of workloads, and/or workload requirements. Each workload (or type of workload, etc.) may be associated with a best available license to optimize performance (e.g., speed of execution) and/or cost depending upon a customer's priorities.

For example, a configuration option may be provided, via system BMC 155 and/or tray BMC 203, for a customer to set a limit on a particular license activation based on: time (e.g., a maximum of 2 hours a day; usable only during a certain time of day; etc.); cost (e.g., the user selects a per hour/daily/weekly/monthly/yearly costs and the BMC determines how long a license can be active to respect the user's limits, etc.); workload (e.g., a computer vision workload requires compression, filtering, decoding, and inferencing; based on these requirements, a license can be spun up to allocate an instance of CPU core, storage, and hardware accelerator slice—such as Multi-Instance GPU (MIG)); and/or power consumption (e.g., a license can be used to maintain power below the maximum power limit of the HPC platform, and/or to select a maximum number of accelerators or cores usable to execute workloads).

In that regard, Table I shows a non-limiting example of workload and cost mapping table usable by system BMC 155 and/or tray BMC 203 to effect licensing allocation determinations:

TABLE I

Workload and Cost Mapping

| License Type | Cost per Hour | Workload Type Best Fit |
|---|---|---|
| A | $0.50 | AI/ML |
| B | $0.21 | Compression |
| C | $0.10 | Encryption |
| ... | ... | ... |

Using Table I, for example, each workload to be executed may be classified as belonging to a particular workload type, for example, using a best fit approach, and each particular workload type may be associated with a distinct license type, with its own cost per hour/day/etc.

Figure 14:
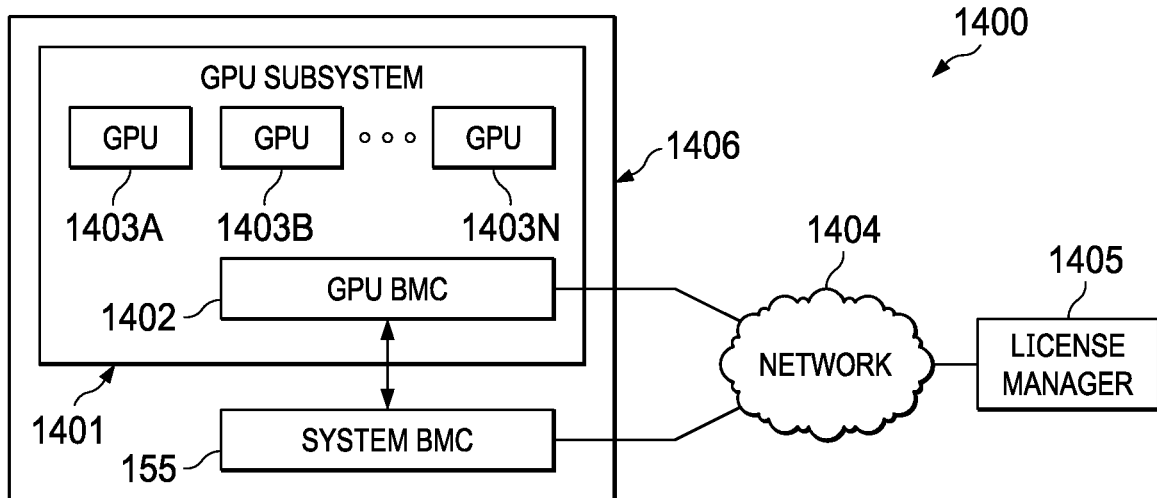
FIG. 14 is a block diagram illustrating an example of a BMC-based accelerator license management system, according to some embodiments.

FIG. 14 is a block diagram illustrating an example of BMC-based accelerator license management system 1400 deployed in HPC platform 1406. In some embodiments, system 1400 may be used to push licenses with respect to GPUs 1403A-N to system BMC 155 and/or GPU BMC 1402 within HPC platform 1406.

Particularly, HPC platform 1406 includes system BMC 155 and GPU subsystem 1401 (e.g., accelerator tray 201). GPU subsystem 1401 includes GPU BMC 1402 (e.g., tray BMC 203) and GPUs 1403A-N (e.g., managed subsystems 202A-N). System BMC 155 and/or GPU BMC 1402 may each have independent access to license manager service 1405 via network 1404 (e.g., the Internet). In some cases, system BMC 155 and/or GPU BMC 1402 may be integrated and/or in communication with each other via a high-speed, OOB management link using one or more of the techniques described above.

Figure 15:
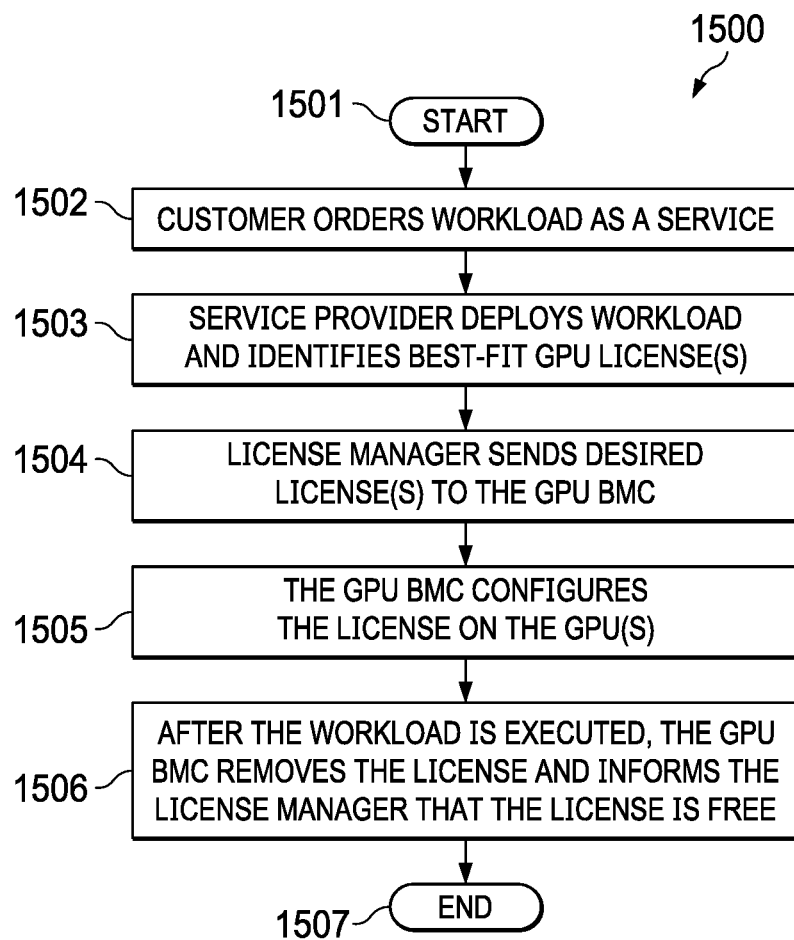
FIG. 15 is a flowchart illustrating an example of a method for BMC-based accelerator license management, according to some embodiments.

FIG. 15 is a flowchart illustrating an example of method 1500 for BMC-based accelerator license management. In some embodiments, method 1500 may be performed, at least in part, by BMC-based accelerator license management system 1400 of FIG. 14. Particularly, method 1500 begins at 1501. At 1502, a customer or user orders the execution of one or more workloads as-a-service (e.g., on a local HPC platform, on the cloud, etc.).

At 1503, the service provider deploys the workload(s) and identifies the best-fit GPU license(s) for each workload, which may be based upon the type of workload and/or the user's preferences or settings (e.g., cost vs. speed, cost vs. fidelity, daily cost/usage limits, etc.). Examples of types of workloads may include, but are not limited to, visualization workloads (related to graphics processing), AI/ML workloads (e.g., training, inferencing, etc.), data compression/decompression workloads, data encryption/decryption workloads, or more generally any type of high performance, computationally intensive workloads.

In an alternative embodiment, system BMC 155 may determine the best license based on the workload, and it may request that license from license manager 1405. For example, system BMC 155 may use Table I that maps workload types (column 3) to license types (column 1).

At 1504, license manager 1405 transmits the selected or desired license(s) (e.g., a certificate, file, encryption key, etc.) to GPU BMC 1402 over network 1404 via side-band communications. Alternatively, license manager 1405 may push the license(s) to system BMC 155 over network 1404, and system BMC 155 may validate and send the received license(s) to GPU BMC 1402 for enforcement during execution of one or more workload(s). This may be implemented, for example, in response to GPU BMC 1402 not being connected to network 1404. Moreover, in response to system BMC 155 not being connected to network 1404, license manager 1405 may push the license(s) to GPU BMC 1402 over network 1404, GPU BMC 1402 may send the license(s) to system BMC 155, and system BMC 155 may validate the license(s) and send them back to GPU BMC 1402 for enforcement. In yet other implementations, GPU BMC 1402 may be capable of validating license(s) on its own.

At 1505, GPU BMC 1402 configures the license(s) on a respective one or more of GPUs 1403A-N by turning on/off one or more features (e.g., selected clock frequencies, turbo modes, allowing or forbidding utilization peaks for certain durations, enabling more or fewer cores, etc.), for example, based on a policy (e.g., to enforce or activate the license when certain contextual information is met, such as time-of-day, geographic location, user proximity, calendar event, etc.). At 1506, after the workload(s) are executed, GPU BMC 1402 removes the license(s) and informs license manager 1405 that the license(s) are free or available. In some cases, still at 1506, GPU BMC 1402 may de-energize or power down one or more idle cores until a new workload is deployed. Method 1500 ends at 1507.

As such, systems and methods described herein may provide for GPU subsystem 1401 (or accelerator tray 201, etc.) to operate as a license manager/enforcer with respect to local resources 1403A-N. Additionally, or alternatively, these systems and methods may provide for system BMC 155 to serve as a proxy license provisioner to GPU BMC 1402. Additionally, or alternatively, these systems and methods may: dynamically adjust custom-built licenses while workloads are composed or queued for execution (which generally enables an HPC platform to operate initially or by default with under-provisioned licenses), de-energize and/or throttle specific accelerators 1403A-N or cores when not in use, free licenses no longer in use, cap license usage based on desired maximum costs, map license types/capabilities for workload types, and/or gather licensing statistics (e.g., usage for auditing purposes).

Additionally, or alternatively, with respect to license usage, GPU BMC 1402 may be configured to release a license if idle or not used for a pre-configured amount of time. For example, an ML workload may be launched that is designed to predict license usage, and the results of the ML workload may be used to change the pre-configured amount of time after which GPU BMC 1402 releases a particular license, for example, based on contextual information. Moreover, GPU BMC 1402 may select PCI power excursion sub-groups (e.g., among accelerators 1403A-N) based upon peak utilization models, or the like.

Prioritized Power Management

In conventional implementations, when the power consumption of an HPC platform exceeds a power limit (e.g., set by the user as a power cap, dictated by a PSU rating, etc.), its CPU is deeply throttled. Deep throttling brings the whole HPC platform to a crawling state with up to a 95% reduction in performance. Types of events that can trigger throttling include the detection of: a high output power supply current, a power supply input undervoltage, and/or an over temperature condition. After the event, the HPC platform's control logic may progressively reduce the amount of throttling applied to the CPU as part of a recovery process.

With the development of PCIe accelerators and add-in cards that consume 600 W or more, and with the growing the number of PCIe lanes in each HPC platform, however, the amount of power consumed by accelerator components now far exceeds a CPU's. Particularly when accelerator components are the primary contributor(s) of power excursion/throttling events, the traditional approach of slowing down the entire HPC platform, including its CPU, is ineffective, and it becomes important to manage the power consumption at the individual device level.

To address these, and other concerns, embodiments of systems and methods described herein may enable system BMC 155 and/or tray BMC 203 to read dynamic power consumption telemetry from managed subsystems 202A-N. For example, with the support of a high-speed, OOB management link between system BMC 155 and/or tray BMC 203, system BMC 155 may receive real-time power consumption information from managed subsystems 202A-N, and it may use that information to determine how much each individual subsystem and/or core is contributing to the overall HPC platform's power load. Then, system BMC 155 may instruct tray BMC 203 to throttle managed subsystems 202A-N, at least in part, in a manner proportional to their respective contributions.

In some implementations, system BMC 155 and/or tray BMC 203 may individually throttle any offending subsystems (e.g., the n larger contributors to the power excursion/throttling event) without affecting the power allocated to the HPC platform's CPU and/or memory complex. Additionally, or alternatively, system BMC 155 and/or tray BMC 203 may trigger the migration of one or more workloads from an offending subsystem to a non-offending subsystem. In some cases, system BMC 155 and/or tray BMC 203 may manage the amount of power allocated to each subsystem, for example, based upon a license and/or policy.

Figure 16:
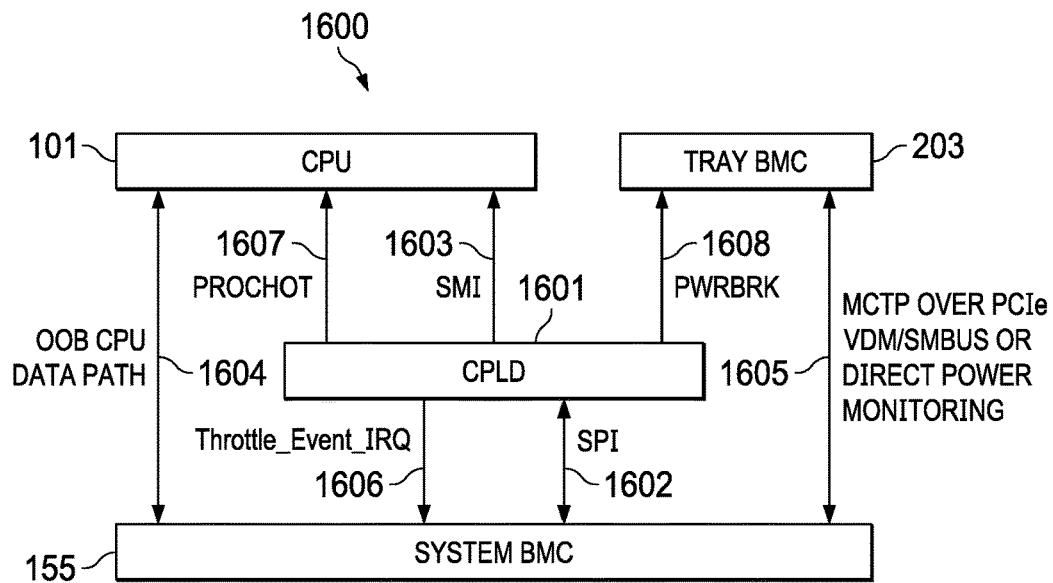
FIG. 16 is a block diagram illustrating an example of a system for BMC-based power throttling of accelerators, according to some embodiments.

FIG. 16 is a block diagram illustrating an example of system 1600 for BMC-based power throttling of accelerators. In some embodiments, system 1600 may include system BMC 155, Complex Programmable Logic Device (CPLD) 1601, CPU 101, and tray BMC 203. System BMC 155 is configured to establish CPU data path 1604 with CPU 101, and MCTP over PCIe VDM/SMBUS or direct power monitoring channel or link 1605 with tray BMC 203. System BMC 155 may receive throttle event interrupt 1606 from CPLD 1601, for example, in response to a determination that a power budget has been exceed for HPC platform 1600.

System BMC 155 may communicate with CPLD 1601 over Serial Peripheral Interface (SPI) bus 1602, for example. Moreover, CPLD 1601 may be configured to issue processor hot (PROCHOT) command 1607 (e.g., in Linux) to throttle CPU 101 and/or one or more power reduction (PWRBRK) command(s) 1608 (e.g., via a PCIe pin) to tray BMC 203 to prioritize the amount of throttling of each device or managed subsystem (e.g., 202A-N) in response to power excursion events where the total power consumed by HPC platform 1600 exceeds a maximum limit. In some cases, system BMC 155 may use System Management Interrupt (SMI) bus 1603 to communicate with system BIOS 117 via CPU 101 to change set a PCIe slot's power limit.

Figure 17:
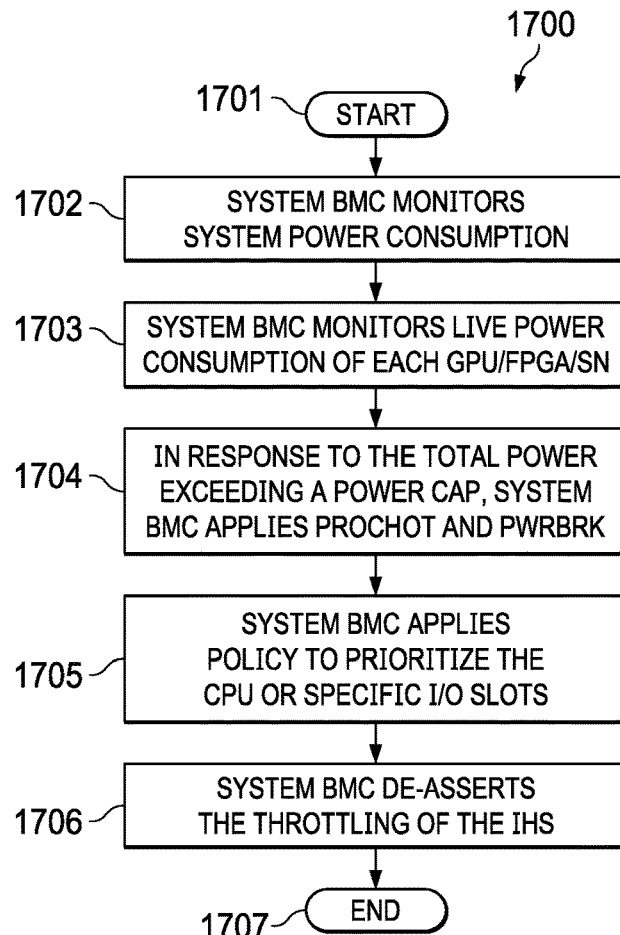
FIG. 17 is a flowchart illustrating an example of a method for BMC-based power throttling of accelerators, according to some embodiments.

FIG. 17 is a flowchart illustrating an example of method 1700 for BMC-based power throttling of accelerators. In some embodiments, method 1700 may be performed, at least in part, by system 1600 of FIG. 16. Particularly, method 1700 begins at 1701.

At 1702, system BMC 155 monitors HPC platform 1600's system power consumption (total power consumed) and CPU/memory/storage/fan contributions. At 1703, system BMC 155 monitors the live power consumption of each of GPUs 1403A-N, for example, via link 1605 with tray BMC 203. System BMC 155 may track the consumption % and/or ratio of each subsystem (1403A-N) with respect to the overall, total power. System BMC 155 may also store the expected throttled power consumption of each subsystem. In some cases, system BMC 155 may apply an upper bound to each of the subsystem (e.g., based on live consumption data and per-policy for each subsystem, to ensure each subsystem is allotted a "do not exceed" power limit at or below their theoretical maximum, depending upon policy).

At 1704, when the total power of blocks 1702 and 1703 exceed a maximum allowed amount of power consumption for HPC platform 1600, system BMC 155 applies PROCHOT command 1807 and PWRBRK command 1808.

At 1705, system BMC 155 applies a user policy to prioritize the delivery of power to CPU 101 and/or specific ones of GPU slots 1403A-N. For example, when GPU slots 1403A-N are prioritized over CPU 101, system BMC 155 identifies the specific adapter which is consuming addition power and changes the power limit on that specific card. I/O card throttling methods may include, for example: (a) pulse-width modulating (PWM) PWRBRK commands 1608 (and varying the duty cycle, etc.) transmitted to tray BMC 203 and/or individually/directly to each of managed subsystems 202A-N on a per-slot basis; and/or (b) decoding a programmable throttling level for each GPU slot 1403A-N based upon messages encoded in PWRBRK commands 1608. At 1706, system BMC 155 de-asserts the throttling of HPC platform 1600, and method 1700 ends at 1707.

In various embodiments, system BMC 155 may enable setting a power limit at each card, in addition to the HPC platform 1600's level power cap (e.g., automatically or through user action, such as via an API call). To set or modify an add-in card slot power limit, BMC 155 may communicate with BIOS 117 over SMI 1603. In addition to, or as an alternative to continuous polling by system BMC 155 (which can miss peaks if not performed at a sufficiently high frequency), each of GPUs 1403A-N may be configured to alert system BMC 155, through tray BMC 203, when a programmable power threshold has been reached or exceeded.

Moreover, a policy may allow certain subsystems not to throttle, to be the last to throttle, etc., for example, depending upon a type or priority of workloads assigned to those devices. Additionally, or alternatively, a subsystem priority indication may be identified by system BMC 155, for example, based upon a policy, and system BMC 155 may send that information to a locally executed and/or remotely located workload manager configured to assign one or more high-priority workload(s) to one or more last-to-be-throttled subsystem(s), and/or one or more low-priority workload(s) to other subsystem(s), to reduce the likelihood of performance reduction.

Figure 18:
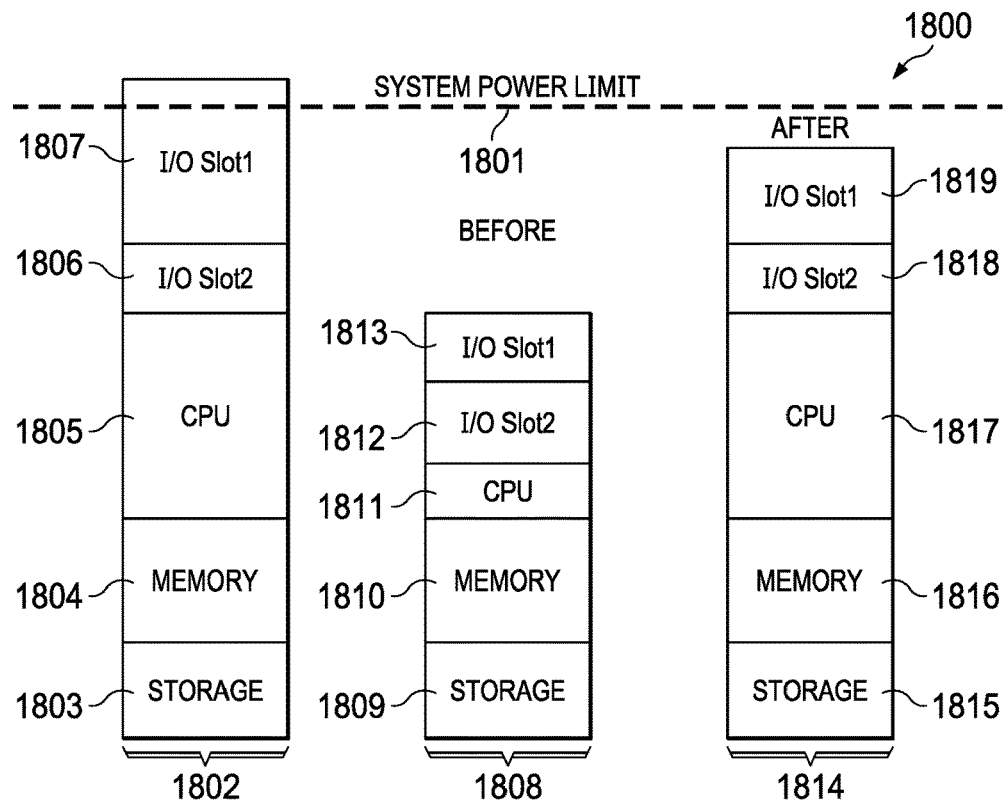
FIG. 18 is a chart illustrating an example use-case of an application of systems and methods for BMC-based power throttling of accelerators, according to some embodiments.

FIG. 18 is a chart illustrating example use-case 1800 of an application of systems and methods for BMC-based power throttling of accelerators. Initial state 1802 shows the power consumption of storage system 1803, memory 1804, CPU 1805, and GPU slots 1806 and 1807 (1403A-N), which add up to more than system power limit 1801 (e.g., 1,800 W). State 1808 ("before") shows the power consumed by storage system 1809, memory 1810, CPU 1811, and GPU slots 1812 and 1813 being reduced under power limit 1801 but also deeply throttling CPU 1811 (e.g., by issuing a PWRBRK command with respect to all slots or PCIe Endpoints 1812 and 1813 and PROCHOT with respect to CPU 1811).

In contrast, state 1814 ("after") shows the total power consumption of storage 1815, memory 1816, CPU 1817, and GPU slots 1818 and 1819 after implementation of systems and method described herein, which maintain the performance/consumption of CPU 1805 and reduces the performance/consumption of I/O slot 1819 while keeping the total power consumption under power limit 1801. The maximum allowable power consumption of I/O slot 1819 may be reduced over I/O slot 1818 based on a policy, license, etc.

For example, a user may configure system BMC 155 via a policy to prioritize the throttling of I/O slot 1819 (priority=1, first to throttle, no less than 50%) over CPU 1817 (priority=2, second to throttle, for example, if the first throttling is insufficient to reduce the total power consumption below the power limit), and of CPU 1817 over I/O slot 1818 (priority=3, third to throttle, for example, if the second throttling is still insufficient to reduce the total power consumption below the power limit). Additionally, or alternatively, the user may configure system BMC 155 to reduce the power consumption of any given device by at least a first selected amount (e.g., at least a 25% reduction from a nominal or measured value) and/or by no more than a second selected amount (e.g., no more than a 50% reduction from a nominal or measured value).

In some cases, system BMC 155 may prioritize the throttling of individual devices without direct user input, for example, based upon a priority of a workload executed, a type of workload executed, a device, a type of device (e.g., GPU vs. VPU), and/or a license. For instance, a license may indicate throttling parameters to be applied to a given managed subsystem 202A-N (e.g., relative to a CPU and/or other subsystems) in the case of power excursion events.

As such, systems and methods described herein may enable controlling throttling effects to target specific I/O subsystems (e.g., slot/GPU on an accelerator tray), separate from the CPU complex. For example, system BMC 155 may be configured to track the relative contributions of each I/O element separate from the CPU, memory, storage, along with expected responses to throttling events. Additionally, or alternatively, these systems and methods may enable configuring a PCIe Endpoint (add-in card or accelerator on a tray) to have dynamically programmable responses to PWR-BRK (beyond static emergency power level reductions), including changes to power exclusions, set limits (e.g., 50%), etc.

In some cases, systems and methods may support an API to dynamically redirect throttling levels to different PCIe Endpoints (e.g., slots, accelerators on a given tray, etc.) for example, based on workload priority, managed subsystem priority, etc. Such an API may also enable system BMC 155 to communicate, to each PCIe Endpoint, what custom action to take in response to receiving a PWRBRK command. Moreover, these systems and methods may enable endpoints to alert a BMC when slot power limits and/or programmable PWRBRK responses see threshold crossings.

Telemetry for AI/ML Workloads

In various embodiments, systems and methods described herein may be implemented in enterprise environments, where AI and HPC platforms are being deployed at a fast pace and organizations are attempting to monetize them. Currently, when an IT department deploys an AI platform in its datacenter, they lack insight into accelerator (e.g., GPU, etc.) utilization, efficiency, and/or allocation (e.g., based workload requirement and GPU scheduling). Moreover, IT departments also lack the ability to "charge back" their customers based on compute resource used.

As more organizations continue to adopt "as a service" business models, having a single plane of glass into all accelerator resources becomes more important. To address these, and other concerns, systems and methods described herein may enable the gathering and analysis of telemetry to enable a user and/or an IT department to determine, for example, when a workspace is launched, how long the workspace will run, what its resource utilization will be, and/or how to charge the customer back.

Figure 19:
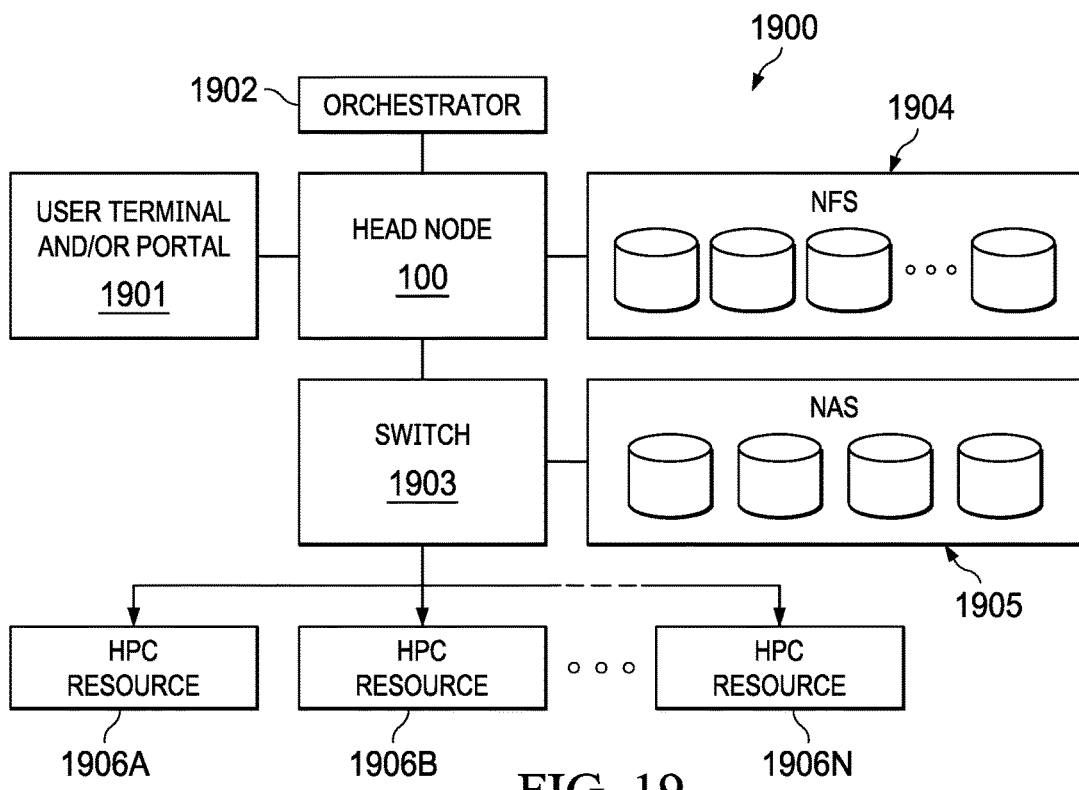
FIG. 19 is a block diagram illustrating an example of an HPC enterprise platform suitable for employing an Artificial Intelligence (AI)/Machine Learning (ML) telemetry system, according to some embodiments.

FIG. 19 is a block diagram illustrating an example of AI/HPC enterprise platform 1900 suitable for employing an AI/ML telemetry system. In some cases, head node 100 may be implemented as any of the IHSs or HPC platforms described herein. User terminal and/or portal 1901 (e.g., a Jupyter notebook, a user's IHS, a web portal, etc.) receives ML workloads from a user and sends those ML workloads to head node 100, which are then managed by orchestrator or workload manager 1902 (e.g., a Bright Cluster Manager or the like).

Examples of ML workloads may include, but are not limited to: regression workloads (e.g., Ordinary Least Squares Regression (OLSR), Linear Regression, Logistic Regression, Stepwise Regression, Multivariate Adaptive Regression Splines (MARS), Locally Estimated Scatterplot Smoothing (LOESS), etc.), instance-based workloads (e.g., k-Nearest Neighbor (kNN), Learning Vector Quantization (LVQ), Self-Organizing Map (SOM), Locally Weighted Learning (LWL), Support Vector Machines (SVM), etc.), regularization workloads (e.g., Ridge Regression, Least Absolute Shrinkage and Selection Operator (LASSO), Elastic Net, Least-Angle Regression (LARS), etc.), decision tree workloads (e.g., Classification and Regression Tree (CART), Iterative Dichotomizer 3 (ID3), C4.5 and C5.0, Chi-squared Automatic Interaction Detection (CHAID), Decision Stump, M5, Conditional Decision Trees, etc.), Bayesian workloads (e.g., Naive Bayes, Gaussian Naive Bayes, Multinomial Naive Bayes, Averaged One-Dependence Estimators (AODE), Bayesian Belief Network (BBN), Bayesian Network (BN), etc.), clustering workloads (e.g., k-Means, k-Medians, Expectation Maximization (EM), Hierarchical Clustering, Association Rule Learning Algorithms, etc.), association rule learning workloads (e.g., Apriori algorithm, Eclat algorithm, etc.), artificial neural network workloads (e.g., Perceptron, Multilayer Perceptrons (MLP), Back-Propagation, Stochastic Gradient Descent, Hopfield Network Radial Basis Function Network (RBFN), etc.), deep learning workloads (e.g., Convolutional Neural Network (CNN), Recurrent Neural Networks (RNNs), Long Short-Term Memory Networks (LSTMs), Stacked Auto-Encoders, Deep Boltzmann Machine (DBM), Deep Belief Networks (DBN), etc.), dimensionality reduction workloads (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), etc.), ensemble workloads (e.g., Boosting, Bootstrapped Aggregation (Bagging), AdaBoost, Weighted Average (Blending), Stacked Generalization (Stacking), Gradient Boosting Machines (GBM), Gradient Boosted Regression Trees (GBRT), Random Forest, etc.), etc.

To execute ML workloads, head node 100 is coupled to HPC resources 1906A-N (e.g., other HPC platforms, hardware accelerators, acceleratory trays, etc.) via switch 1903 (e.g., an InfiniBand switch or the like). In some cases, head node 100 may be coupled to Network File System (NFS) 1904 directly and/or to Network-attached storage (NAS) 1905 via switch 1603.

Figure 20:
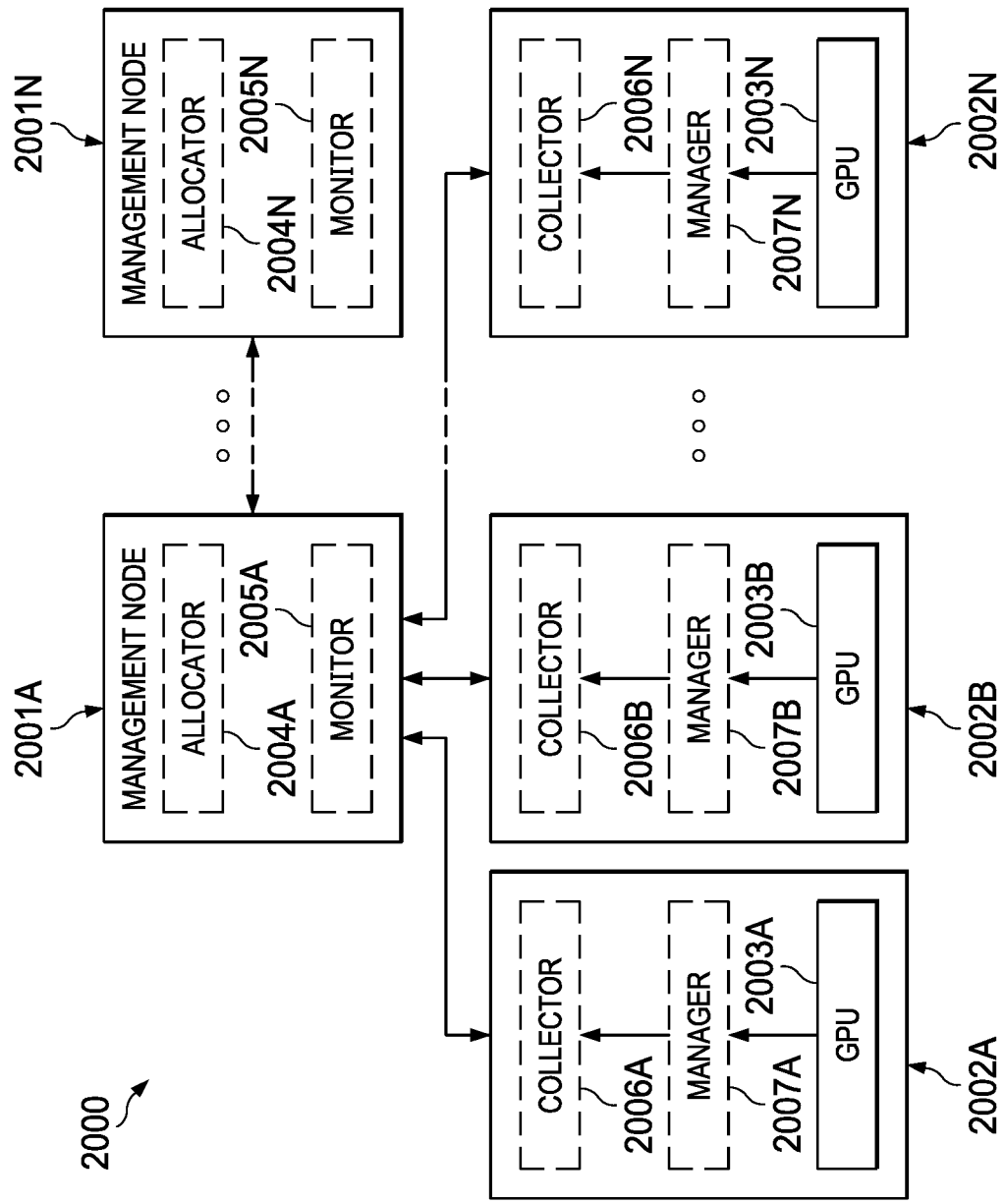
FIG. 20 is a block diagram illustrating an example of an AI/ML telemetry system, according to some embodiments.

FIG. 20 is a block diagram illustrating an example of AI/ML telemetry system 2000. In some embodiments, telemetry system 2000 may be implemented in HPC platform 1900 of FIG. 19. Particularly, telemetry collector agents 2006A-N (e.g., implemented in one or more BMCs) may be in communication with managers 2007A (e.g., NVIDIA Data Center GPU Manager or "DCGM," etc.), which are in turn configured to receive telemetry and/or usage data from GPUs 2003A-N in each respective one of HPC resources 2002A-N (e.g., 1906A-N in FIG. 19).

Allocator agents 2004A-N of management nodes 2001A-N (e.g., each node as an instance of 1900/100 in FIG. 19) are in communication with telemetry collector agents 2006A-N via telemetry monitors 2005A-N (e.g., Prometheus as a monitoring and alerting toolkit that scrapes the metrics exported from every collector agent 2006A-N and places the data in a time series database that can be read by any suitable tool for interactive visualization of data, for example, to produce data dashboards, etc.).

In operation, telemetry system 2000 acts as a shim layer that sits between orchestrator 1902 and HPC resources 1906A-N. In various embodiments, telemetry system 2000 may be configured to collect telemetry data from HPC resources 1906A-N, run analytics on the telemetry data, provide usage statistics (e.g., in the form of visual dashboards, etc.) to an IT administrator, automatically allocate resources based on telemetry data, and/or calculate resource allocation based on ML workload profiles.

For example, telemetry collector agents 2006A-N may be configured to collect data, per individual HPC resource (e.g., trays, accelerators, GPUs, cores, etc.), including, but not limited to: power consumption, operating temperature, memory usage, core load/utilization, disk usage, and network usage, etc. Additionally, or alternatively telemetry collector agents 2006A-N may be configured to collect information usable to characterize aspects of workload(s) queued for execution, workload(s) currently in execution, workload(s) completed, workload(s) successfully completed, and associated performance metrics (e.g., workload execution time, etc.).

Meanwhile, allocator agents 2004A-N may be configured to aggregate the telemetry data from each of collector agents 2006A-N to determine, for example, how long it will take a particular workload or type of workload to be executed by a given one of GPUs 2003A-N for workload allocation purposes. Additionally, or alternatively, allocator agents 2004A-N may determine that a particular HPC resource is underutilized despite having a been assigned a given workload and, in response, orchestrator 1902 may deny a user access to the HPC resource. Additionally, or alternatively, allocator agents 2004A-N may be configured to determine a node-level resource usage based on ML workload ID and/or a charge back for each ML workload ID (e.g., based upon the amount or resources and/or time spent).

Based on system power usage, allocator agents 2004A-N may also determine infrastructure cost for power and/or cooling, which may in turn be used to determine, for example, based on the daily energy cost, when to deploy certain types of workloads with certain usage statistics. Moreover, allocator agents 2004A-N may also be configured to determine, based upon the telemetry data, whether a workload should be allocated on-premises and/or on the cloud; which may be particularly useful, for example, in situations where large AI/ML training workloads are deployed.

Although FIG. 20 shows allocator agents 2004A-N running on management nodes 2001A-N, in other implementations agents 2004A-N may reside on the cloud, or in any suitable location from where they can access telemetry collector agents 2006A-N.

As such, systems and methods described herein may provide collector agents configured to run on a smart controller and collect data from various APIs on compute resources to enable the operation of, for example, full charge back and/or resource allocation models. Additionally, or alternatively, these systems and methods may provide allocator agents configured to provide infrastructure-level service such as power allocation, cooling allocation, ML workload allocation, and/or resource allocation (e.g., at the cluster level).

Additionally, or alternatively, these systems and methods may enable the deployment of GPUs and other hardware accelerators of HPC platforms using an "as a service" model. Additionally, or alternatively, these systems and methods may allow improved prediction of compute resources or instances for IT administrators. Additionally, or alternatively, these systems and methods may enable GPUs for AI/ML workloads to be dis-aggregated since a collector may be the only service running on each GPU node. Additionally, or alternatively, allocator and/or collector agents may be configured to deploy AI privacy techniques to prevent un-authorized use of models and/or data.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a first Baseboard Management Controller (BMC) having a first network port;
a hardware accelerator comprising a second BMC having a second network port; and
an internal bus directly coupling the first BMC with the second BMC, wherein the internal bus is internal to the IHS, and wherein at least one of:
(a) the first BMC is configured to share the first network port with the second BMC in response to a determination that the second network port has failed or has insufficient bandwidth, wherein the second BMC communicates with a remote manager using the first network port of the first BMC via the internal bus directly coupling the first BMC with the second BMC; or
(b) the second BMC is configured to share the second network port with the first BMC in response to a determination that the first network port has failed or has insufficient bandwidth, wherein the first BMC communicates with a same or different remote manager using the second network port of the second BMC via the internal bus directly coupling the first BMC with the second BMC.

2. The IHS of claim 1, wherein at least one of: (a) the first BMC is configured to instantiate a first bridge coupled to a first external management connection established over the first network port, or (b) the second BMC is configured to instantiate a second bridge coupled to a second external management connection established over the second network port.

3. The IHS of claim 2, wherein the first and second bridges are teamed.

4. The IHS of claim 1, further comprising another hardware accelerator comprising a third BMC having a third network port, wherein at least one of the first or second BMCs is configured to share at least one of the first or second network ports with the third BMC in response to a determination that the third network port has failed or has insufficient bandwidth, and wherein the third BMC is configured to share the third network port with at least one of the first or second BMCs in response to a determination that at least one of the first or second network ports has failed or has insufficient bandwidth.

5. The IHS of claim 4, wherein the third BMC is configured to instantiate a third bridge coupled to a third external management connection established over the third network port, and wherein the first, second, and third bridges are teamed.

6. The IHS of claim 1, wherein the hardware accelerator comprises one or more managed subsystems coupled to the second BMC.

7. The IHS of claim 6, wherein the one or more managed subsystems comprise at least one of: a Graphics Processing Unit (GPU), a Field Programmable Gate Array (FPGA), an Intelligence Processing Unit (IPU), a Data Processing Unit (DPU), a Gaussian Neural Accelerator (GNA), an Audio and Contextual Engine (ACE), or a Vision Processing Unit (VPU).

8. The IHS of claim 7, wherein at least one of the managed subsystems comprises a third BMC having a third network port.

9. The IHS of claim 8, wherein at least one of the first or second BMCs is configured to share at least one of the first or second network ports with the third BMC in response to a determination that the third network port has failed or has insufficient bandwidth.

10. The IHS of claim 9, wherein the third BMC is configured to share the third network port with at least one of the first or second BMCs in response to a determination that at least one of the first or second network ports has failed or has insufficient bandwidth.

11. The IHS of claim 1, wherein the internal bus directly coupling the first BMC with the second BMC comprises a Peripheral Component Interconnect (PCIe) link using Management Component Transport Protocol (MCTP) over PCIe Vendor-Defined Messages (VDM).

12. The IHS of claim 1, wherein the second BMC is configured to allocate a first portion of bandwidth available via the second network port to the second BMC, and a second portion of the bandwidth available via the second network port to the first BMC.

13. The IHS of claim 12, wherein the first and second portions are selected based upon a priority of the second BMC over the first BMC.

14. The IHS of claim 1, wherein the second BMC is configured to instruct the first BMC to pause communications in response to a determination of insufficient bandwidth for a total network traffic of the first and second BMCs.

15. A system Baseboard Management Controller (BMC) of an Information Handling System (IHS), the system BMC having program instructions stored thereon that, upon execution, cause the system BMC to:
determine that a first network port of the system BMC has failed or has insufficient bandwidth; and
in response to the determination, communicate with a remote manager using a second network port of an accelerator tray BMC via an internal bus directly coupling the system BMC and the accelerator tray BMC, wherein the internal bus is internal to the IHS.

16. The system BMC of claim 15, wherein the system BMC is coupled to a host processor of the IHS, wherein the accelerator tray BMC is decoupled from the host processor, and wherein the internal bus directly coupling the system BMC and the accelerator tray to each other comprises at least one of: a RMII-Based Transport (RBT), an I²C, or a Universal Serial Bus (USB) link.

17. The system BMC of claim 15, wherein the system BMC is configured to instantiate a first bridge coupled to a first external management connection established over the first network port, wherein the accelerator tray BMC is configured to instantiate a second bridge coupled to a second external management connection established over the second network port, and wherein the first and second bridges are teamed.

18. A method, comprising:
instantiating, by a first Baseboard Management Controller (BMC) of an Information Handling System (IHS), a first bridge coupled to a first external management connection established over a first network port;
instantiating, by a second Baseboard Management Controller (BMC) of the IHS, a second bridge coupled to a second external management connection established over a second network port; and in response to a determination that the first network port has failed or has insufficient bandwidth, establishing the first external management connection of the first BMC over the second network port via an internal bus directly coupling the first BMC and the second BMC to each other, wherein the internal bus is internal to the IHS.

19. The method of claim 18, wherein one of the first or second BMCs is coupled to a host processor of the IHS, wherein another of the first or second BMCs is decoupled from the host processor, and wherein the internal bus directly coupling the first and second BMCs to each other comprises at least one of: a Peripheral Component Interconnect Express (PCIe), a RMII-Based Transport (RBT), an I$^2$C, or a Universal Serial Bus (USB) link.

20. The method of claim 18, further comprising apportioning a bandwidth available through the second network port to the first BMC based, at least in part, upon a priority of first external management connection over the second external management connection.

* * * * *